(12) United States Patent
Erdmann

(10) Patent No.: US 11,399,527 B2
(45) Date of Patent: Aug. 2, 2022

(54) FISHING ROD HOLDER SYSTEM

(71) Applicant: Nathanial Brent Erdmann, Cape Carteret, NC (US)

(72) Inventor: Nathanial Brent Erdmann, Cape Carteret, NC (US)

(*) Notice: Subject to any disclaimer, the term of this patent is extended or adjusted under 35 U.S.C. 154(b) by 400 days.

(21) Appl. No.: 16/783,217

(22) Filed: Feb. 6, 2020

(65) Prior Publication Data

US 2020/0170233 A1 Jun. 4, 2020

Related U.S. Application Data

(63) Continuation of application No. 15/603,939, filed on May 24, 2017, now Pat. No. 10,568,313.

(60) Provisional application No. 62/340,850, filed on May 24, 2016.

(51) Int. Cl.
| | |
|---|---|
| *A01K 97/10* | (2006.01) |
| *B60R 9/08* | (2006.01) |
| *A45F 3/04* | (2006.01) |
| *A45F 3/00* | (2006.01) |

(52) U.S. Cl.
CPC ............... *A01K 97/10* (2013.01); *A45F 3/04* (2013.01); *B60R 9/08* (2013.01); *A45F 2003/001* (2013.01); *A45F 2003/003* (2013.01); *A45F 2200/0566* (2013.01)

(58) Field of Classification Search
CPC .................................. A01K 97/00; B60R 9/08
USPC ......................................................... 43/21.2
See application file for complete search history.

(56) References Cited

U.S. PATENT DOCUMENTS

| | | | | |
|---|---|---|---|---|
| 778,381 | A * | 12/1904 | Sprague ................. | A01K 97/10 248/514 |
| 846,315 | A * | 3/1907 | Keech .................... | A01K 97/10 2/171.03 |
| 3,051,422 | A * | 8/1962 | Crump ................... | A01K 97/10 248/533 |
| 3,564,753 | A * | 2/1971 | Fravel ................... | A01K 97/10 248/538 |
| 4,161,839 | A * | 7/1979 | Ward ..................... | A01K 97/10 43/17 |
| 4,763,435 | A * | 8/1988 | Deering ................. | A01K 97/10 43/21.2 |

(Continued)

FOREIGN PATENT DOCUMENTS

| | | | |
|---|---|---|---|
| CA | 2810890 A1 * | 9/2013 | ............ A01K 97/01 |
| CA | 2810890 A1 | 9/2013 | |

(Continued)

*Primary Examiner* — Christopher P Ellis
(74) *Attorney, Agent, or Firm* — Ward and Smith, P.A.; Ryan K. Simmons

(57) ABSTRACT

A fishing rod holder system for easily transporting, storing, and/or using fishing rods, including one or more rod holding members releasably mountable to receiving member affixed to a separate structure. The one or more rod holding members can be attachable/detachable and swivelable/rotatable about the receiving member. In some embodiments, the positions of the one or more rod holding members can be fixed or adjustable with respect to the receiving member. Further, the rod holding members are substantially hollow tubes for receiving the handle of a fishing rod, wherein the rod holding members may include various configurations of notches and/or slots for engaging with the fishing rod/reel.

20 Claims, 49 Drawing Sheets

(56) References Cited

U.S. PATENT DOCUMENTS

| | | | | |
|---|---|---|---|---|
| 4,908,973 A * | 3/1990 | Perks | A01K 97/125 | 43/16 |
| 4,964,233 A * | 10/1990 | Benson | A01K 97/10 | 43/17 |
| 5,409,291 A * | 4/1995 | Lamb | A01K 97/22 | 224/652 |
| 5,533,295 A * | 7/1996 | Hochberger | A01K 97/10 | 248/512 |
| 6,003,748 A * | 12/1999 | Rivenbark | B60R 9/08 | 224/319 |
| 6,898,892 B2 * | 5/2005 | Senckowski | A01K 97/01 | 43/16 |
| 7,140,507 B2 * | 11/2006 | Maldonado | A45C 11/20 | 220/592.2 |
| 7,232,099 B1 * | 6/2007 | Wilcox | B63B 25/002 | 248/231.91 |
| 7,389,608 B1 * | 6/2008 | MacKay | A01K 97/20 | 206/315.11 |
| 7,650,713 B1 * | 1/2010 | Peede | A01K 97/10 | 43/21.2 |
| 8,375,622 B1 * | 2/2013 | Holzmann, Jr. | A01K 97/10 | 43/21.2 |
| 8,453,373 B2 * | 6/2013 | Gordon | A01K 97/10 | 248/539 |
| 8,544,141 B1 * | 10/2013 | Kyde | A47L 13/51 | 15/264 |
| 8,943,739 B2 * | 2/2015 | Blake, III | A01K 97/06 | 224/259 |
| 9,282,797 B1 * | 3/2016 | Soto | B62B 1/22 | |
| 9,389,010 B1 * | 7/2016 | Booker, Sr. | B62B 3/02 | |
| 9,913,464 B1 * | 3/2018 | Stokes | F16M 13/02 | |
| 9,986,827 B1 * | 6/2018 | Long | B60B 33/0021 | |
| 10,137,916 B1 * | 11/2018 | Glassberg | B62B 3/102 | |
| 10,624,454 B1 * | 4/2020 | Kreinest | B62B 3/04 | |
| 10,961,020 B1 * | 3/2021 | Robbins | A45F 3/46 | |
| 2007/0028504 A1 * | 2/2007 | Cameron | A01K 97/10 | 43/21.2 |
| 2007/0289199 A1 * | 12/2007 | Looney | A01K 97/04 | 220/920 |
| 2008/0185493 A1 * | 8/2008 | Wakefield | A01K 97/06 | 248/512 |
| 2008/0295383 A1 * | 12/2008 | Wakefield | A01K 97/10 | 43/21.2 |
| 2010/0288806 A1 * | 11/2010 | Wier | A45F 3/14 | 224/257 |
| 2011/0025005 A1 * | 2/2011 | Howell | B62B 7/10 | 280/47.24 |
| 2012/0079978 A1 * | 4/2012 | Teel | B63B 17/04 | 114/343 |
| 2013/0227875 A1 * | 9/2013 | DeSpiegelaere | A01K 97/08 | 43/54.1 |
| 2013/0333268 A1 * | 12/2013 | Henry, Jr. | A01K 97/10 | 43/4.5 |
| 2014/0033600 A1 * | 2/2014 | McCorkle | A01K 97/10 | 43/21.2 |
| 2015/0150231 A1 * | 6/2015 | Norman | A01K 97/04 | 43/17.5 |
| 2015/0377549 A1 * | 12/2015 | Cai | A01K 97/06 | 43/17.5 |
| 2016/0021861 A1 * | 1/2016 | Pippins | A01K 99/00 | 43/17.5 |
| 2016/0376064 A1 * | 12/2016 | Raisbeck | A01K 97/10 | 206/315.11 |
| 2017/0231209 A1 * | 8/2017 | Pippins | F21V 33/008 | 43/17 |
| 2017/0245486 A1 * | 8/2017 | Larson | B65D 51/24 | |
| 2017/0339937 A1 | 11/2017 | Erdmann | | |
| 2017/0367311 A1 * | 12/2017 | Zale | A01K 97/06 | |
| 2018/0110210 A1 * | 4/2018 | Placko | B60R 9/06 | |
| 2018/0338623 A1 * | 11/2018 | Winterhalter | A47C 4/20 | |
| 2020/0187477 A1 * | 6/2020 | Clark, Jr. | A01K 97/10 | |
| 2020/0288692 A1 * | 9/2020 | Riley | A01K 97/10 | |

FOREIGN PATENT DOCUMENTS

| | | | | |
|---|---|---|---|---|
| CN | 208001929 U | * | 10/2018 | A01K 97/10 |
| GB | 2539968 A | * | 1/2017 | A01K 89/01925 |
| WO | WO-2018164992 A1 | * | 9/2018 | A01K 97/10 |

* cited by examiner

FISHING ROD HOLDER SYSTEM

RELATED APPLICATIONS

This application is a continuation of and claims priority to U.S. patent application Ser. No. 15/603,939, entitled "Fishing Rod Holder System" filed on May 24, 2017, the application of which claims priority to U.S. Provisional Patent Application No. 62/340,850, entitled "Fishing Rod Holder System" filed on May 24, 2016, the applications of which are incorporate herein by reference in their entirety.

TECHNICAL FIELD

The disclosed subject matter relates generally to fishing rod holders and more particularly to a fishing rod holder system for easily transporting, storing, and/or using fishing rods.

BACKGROUND

Fishing rods can be awkward to hold or carry especially if holding or carrying multiple fishing rods and/or other items at the same time and especially when hiking or traveling in some type of watercraft.

SUMMARY

In some aspects, the disclosed subject matter provides a rod holder system. The rod holder system may include a rod holder, the rod holder may include a substantially hollow tube and a connecting member affixed thereto; and a receiving member, wherein the rod holder is releasably attachable to the receiving member via the connecting member. The system may further include a frame, wherein the receiving member may be affixed to the frame. The frame may be configured to be disposed in a portable pack. The frame may include one or more horizontal and vertical rods configured together to form the frame, wherein at least one of the one or more horizontal rods and/or vertical rods may include a receiving member affixed to an end portion thereof. The frame may be configured in a generally "L" or "U" shape. The rod holder may be rotatable about the receiving member when attached thereto via the connecting member. The connecting member and receiving member may be attachable via a spring-loaded button system, wherein a spring-loaded button is provided in one of the receiving member or the connecting member and one or more corresponding holes are provided in the other one of the receiving member or the connecting member. The one or more corresponding holes may include a plurality of holes, and wherein the plurality of holes may be configured to be spaced about an equal distance from one another about a periphery of the one of the connecting member or receiving member. The spring-loaded button system may include a spring-loaded double button. The connecting member may be affixed at about a midpoint along the length of the rod holder and extends out in a perpendicular orientation therefrom. The hollow tube of the rod holder may be configured to receive a handle portion of a fishing rod. The hollow tube of the rod holder may include one or more slots and/or notches formed in a side wall thereof. The one or more slots and/or notches may include a first pair of opposing notches formed at a first end of the hollow tube of the rod holder. The system may include a second pair of opposing notches formed at a second end of the hollow tube of the rod holder and arranged about 90 degrees out of phase with the first pair of opposing notches at the first end of the hollow tube of the rod holder. The one or more slots and/or notches, may include at least a single slot, wherein the single slot extends a full length of the hollow tube of the rod holder. The system may further include a slide rail, wherein the slide rail is configured to attach between at least two receiving members. The system may further include a slide rail, wherein the slide rail is configured to attach between at least two of any of horizontal rods, vertical rods and/or receiving members. The slide rail may be configured to receive the connecting member of the rod holder such that the rod holder is slideable along the length of the slide rail. The receiving member may include one of a rail mount, a corner mount, a flush mount, or a track mount. The rail mount may include a U-clamp having one or more receiving members affixed thereto and configured for securing the receiving member to a rail structure. The corner mount comprises an angled plate having one or more receiving members affixed thereto. The flush mount may include a flat plate, wherein the receiving member may be affixed thereto, such that the receiving member extends through the plate extending from a first side and a second side of the plate. The receiving member may be releasably attachable to the connecting member via a spring-loaded double button system. The s track mount may include a flat plate having one or more feet structures adjustably attached on one side of the plate, wherein the one or more feet structures are configured to engage a track; at least one receiving member affixed to the other side of the plate; and an adjustment mechanism for securing the one or more feet within the track. The rod holder may be extendable in a horizontal direction from the receiving member. The system may further include an accessory holder, wherein the accessory holder may include a connecting member affixed thereto and may further be configured to releasable attach to a receiving member. The connecting member may be attachable to the receiving member and/or a slide rail via a 90-degree ring clamp. The connecting member may be attachable to the receiving member via a split collar lock. The receiving member may include one of a T-mount or H-mount. The receiving member may be affixed to one or more of a flat plate, angled plate, or U-clamp.

In another aspect, the disclosed subject matter provides a rod holder. The rod holder may include a substantially hollow tube; and a connecting member affixed thereto, wherein the connecting member is configured to be releasably attachable to a receiving member.

In yet another aspect, the disclosed subject matter provides a receiving member, wherein the receiving member may include an attachment mechanism configured to accept a connecting member in a releasable manner.

BRIEF DESCRIPTION OF THE DRAWINGS

Figure 1:
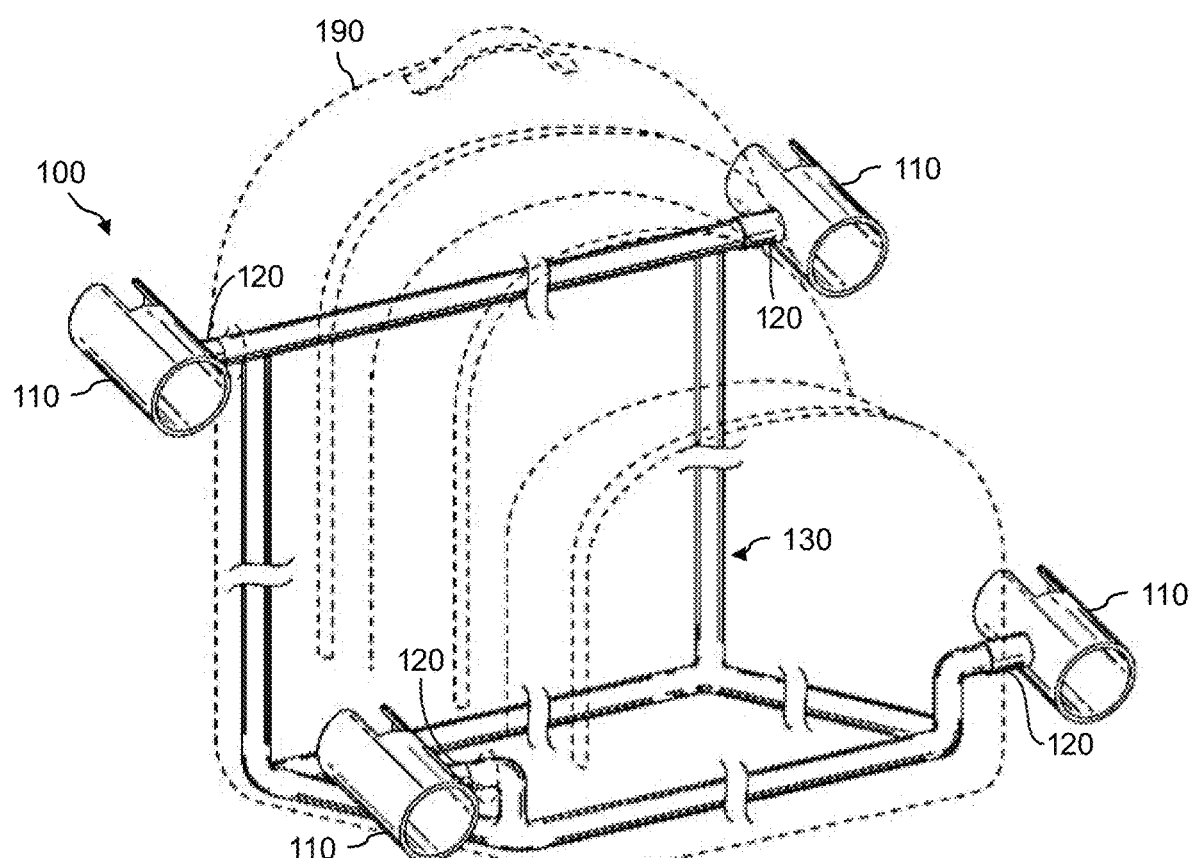
Figure 2:
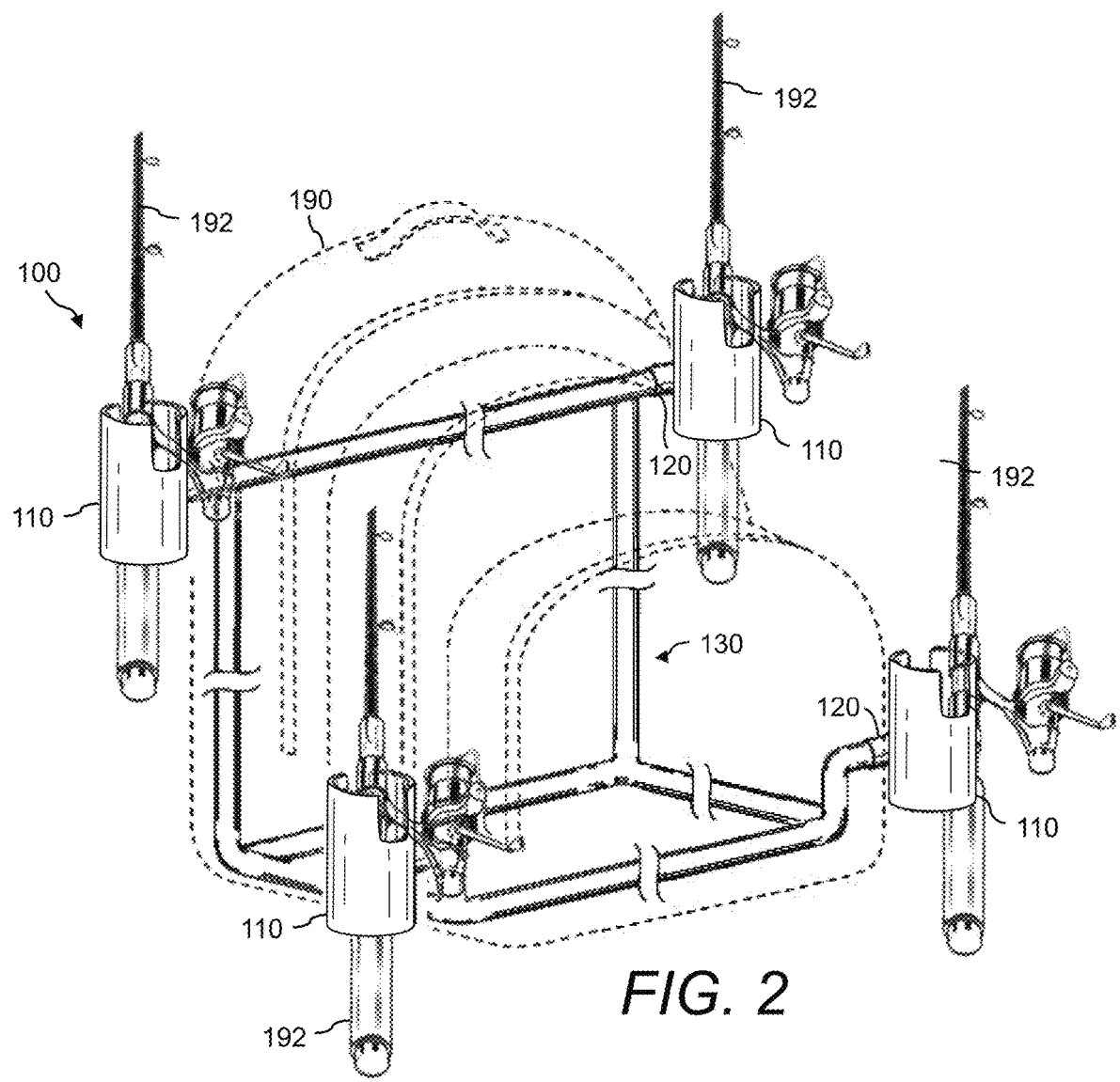
Figure 3:
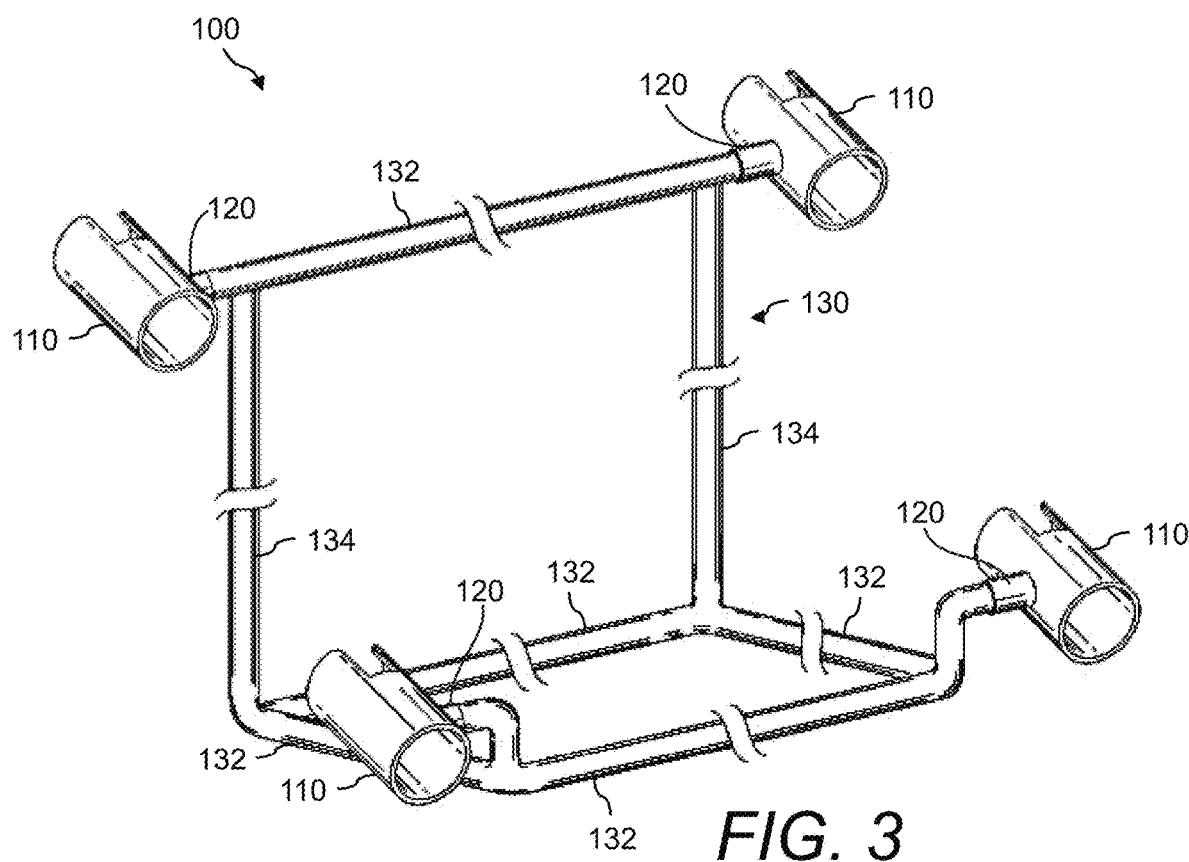
Figure 4:
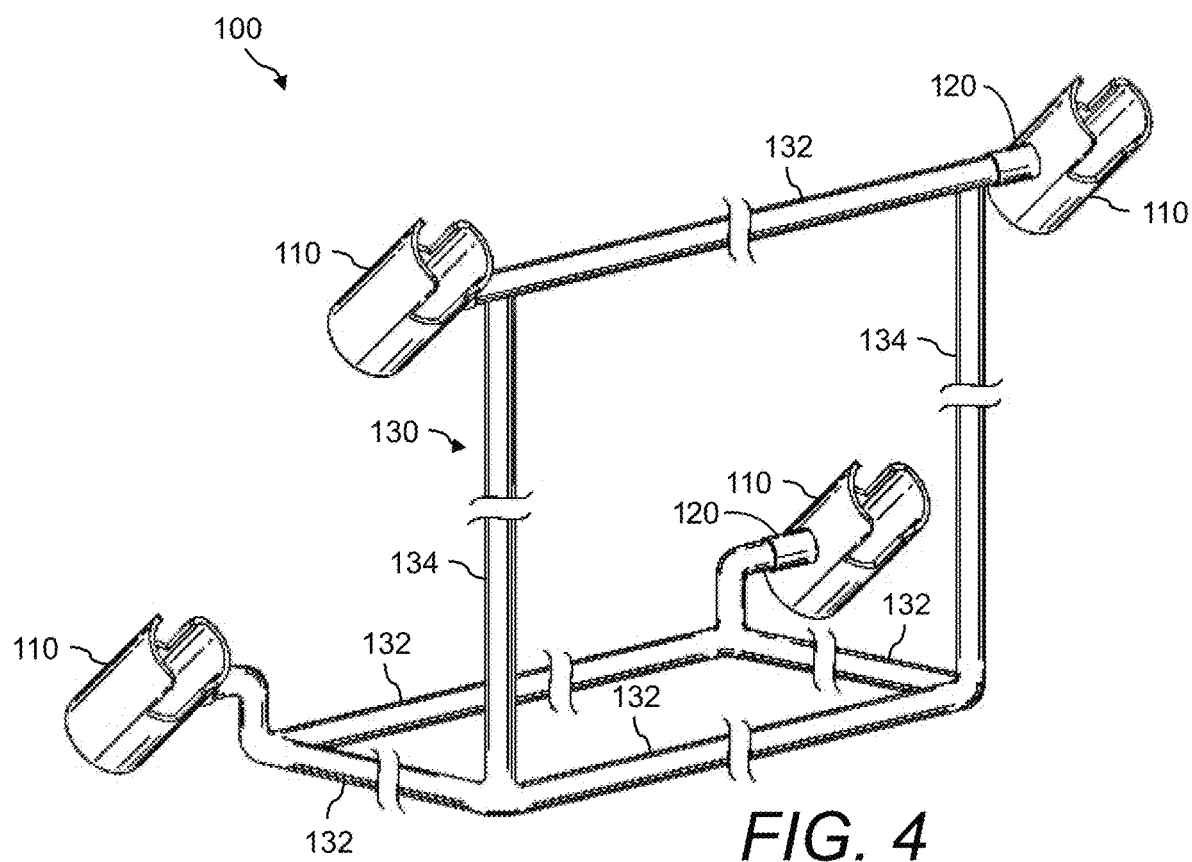
Figure 5:
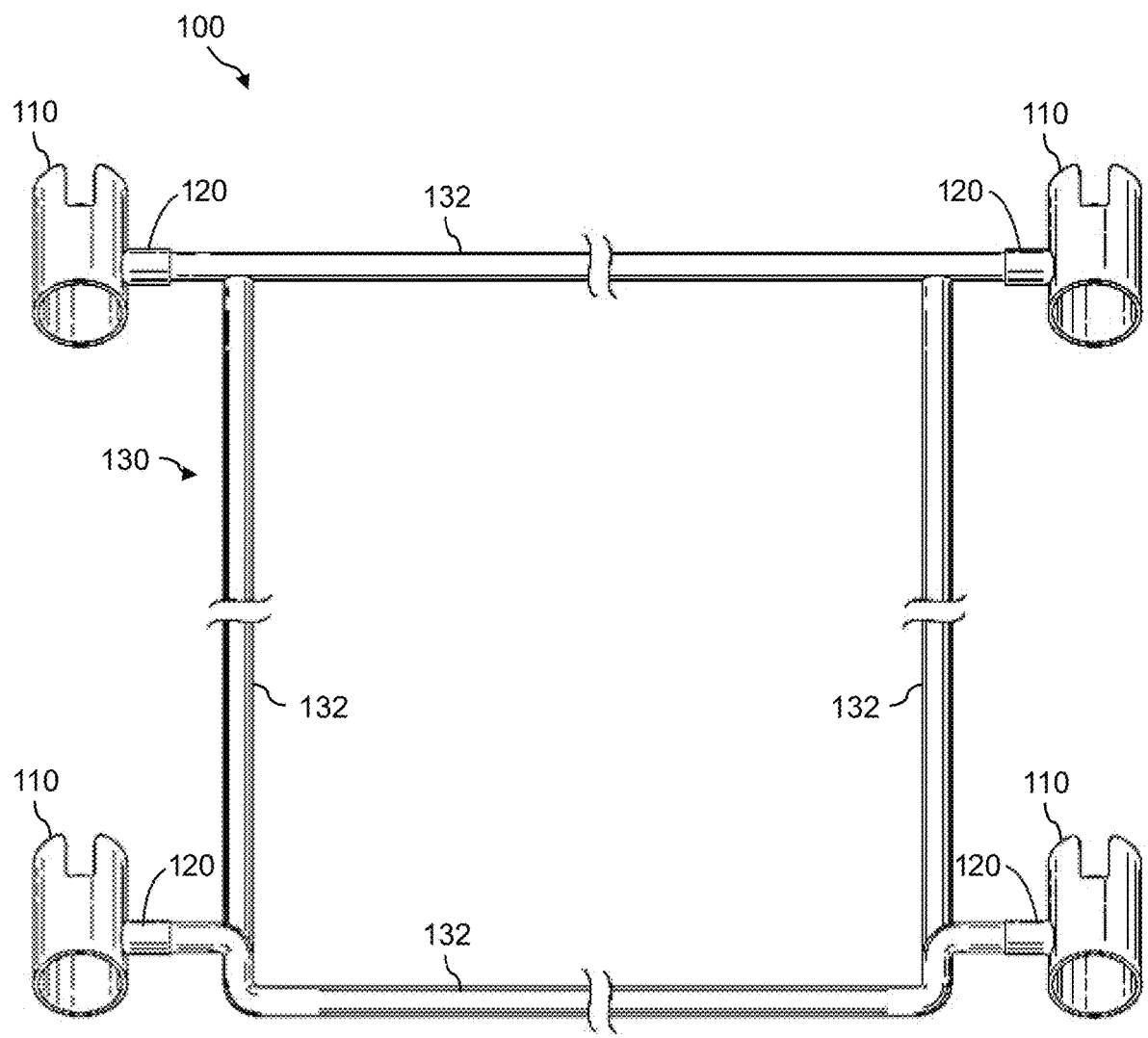
Figure 6:
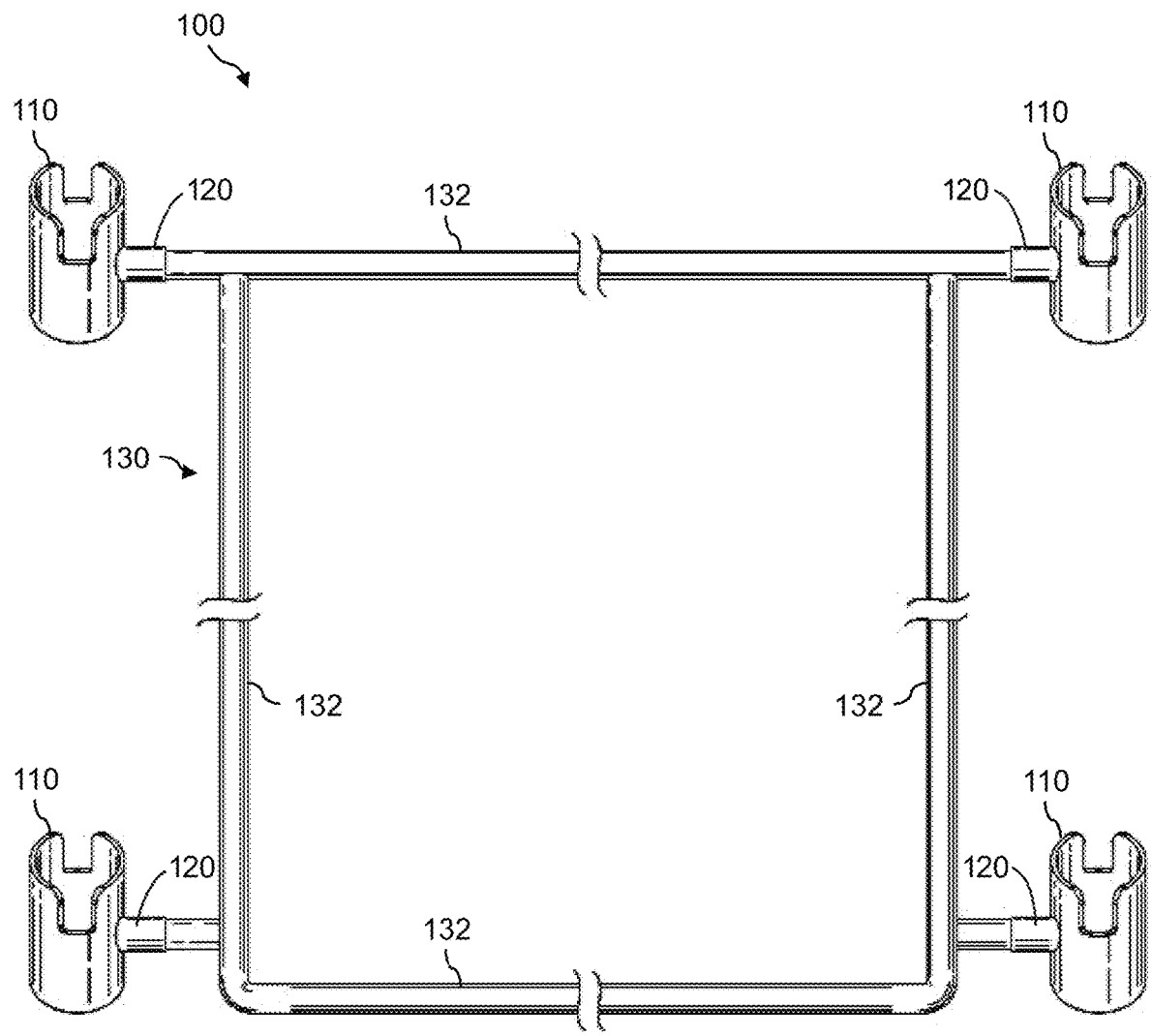
Figure 7:
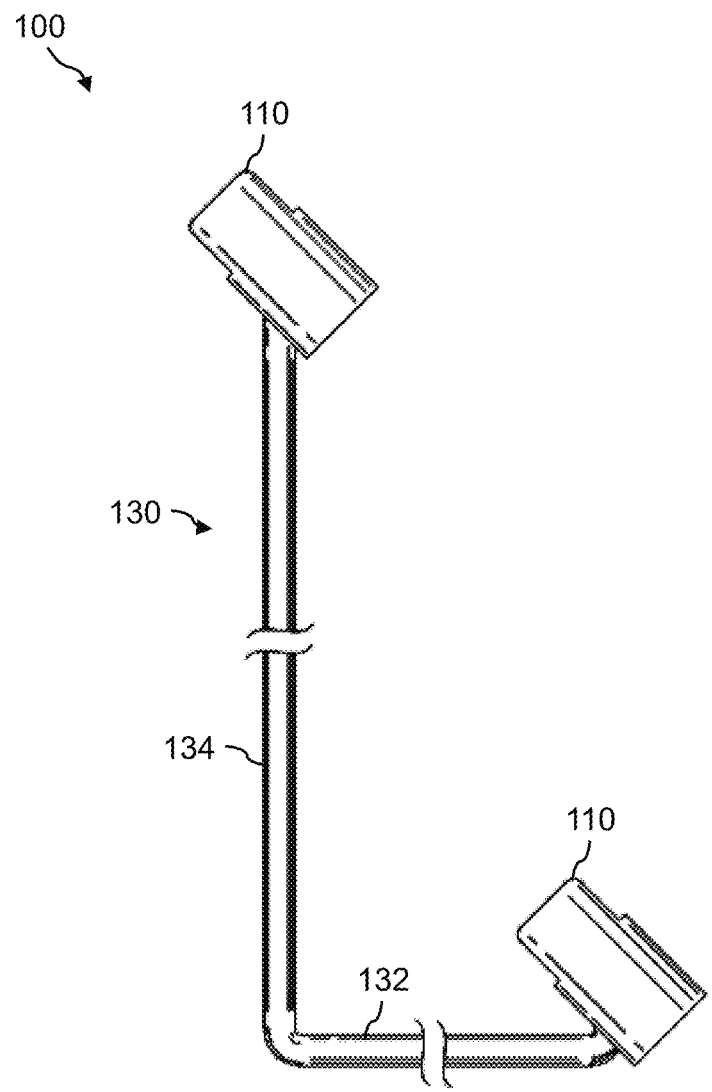
Figure 16A:
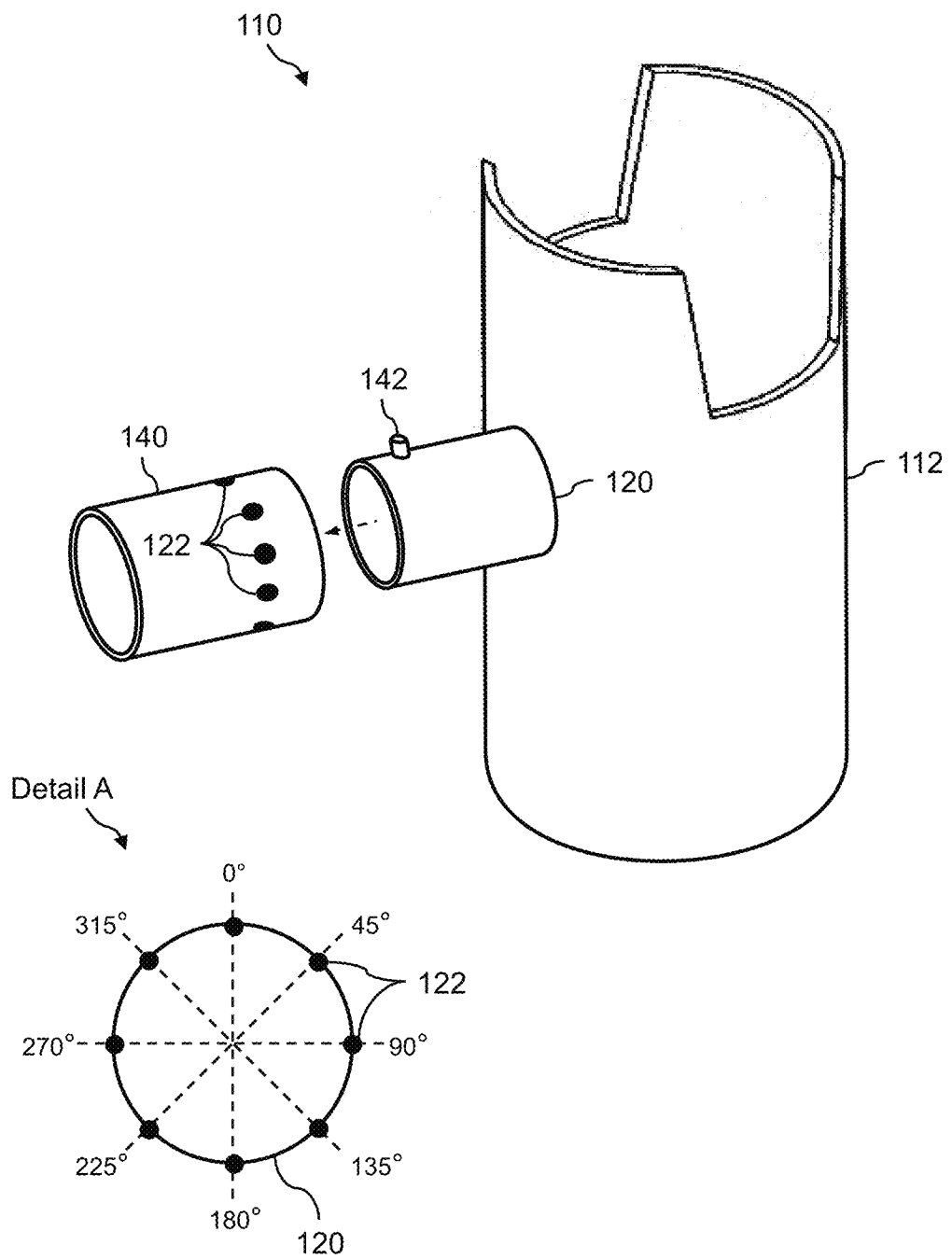
Figure 16B:
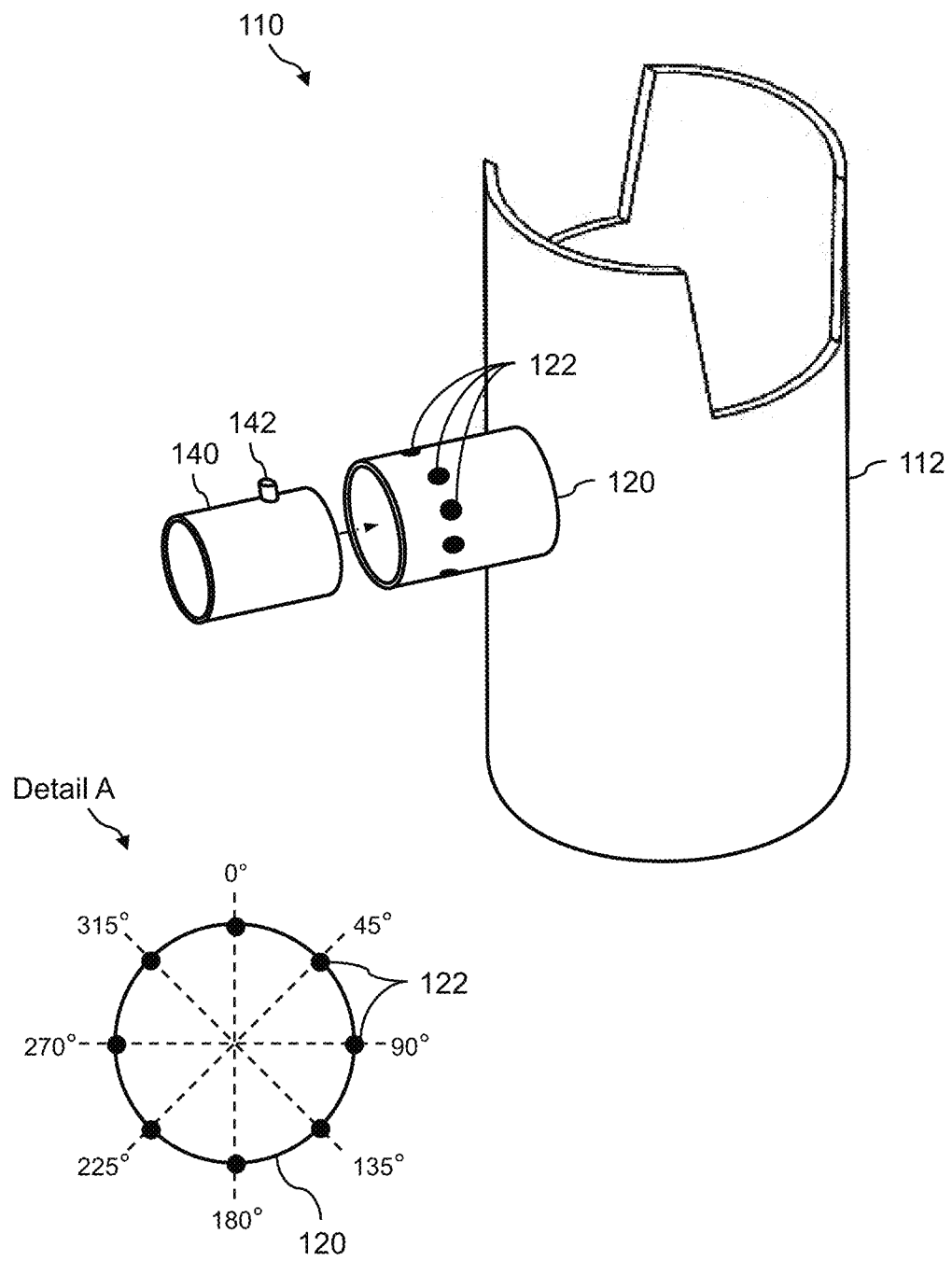
Figure 17:
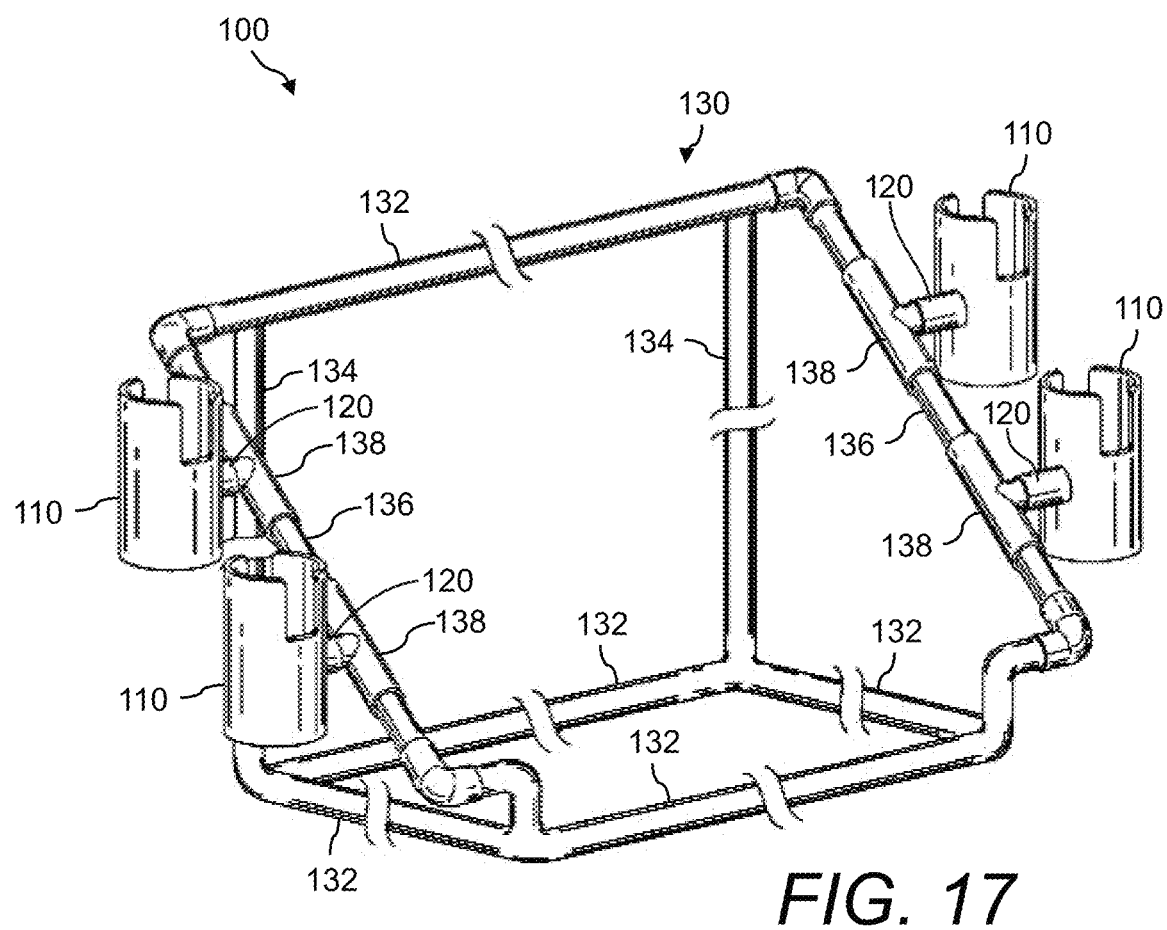
Figure 18:
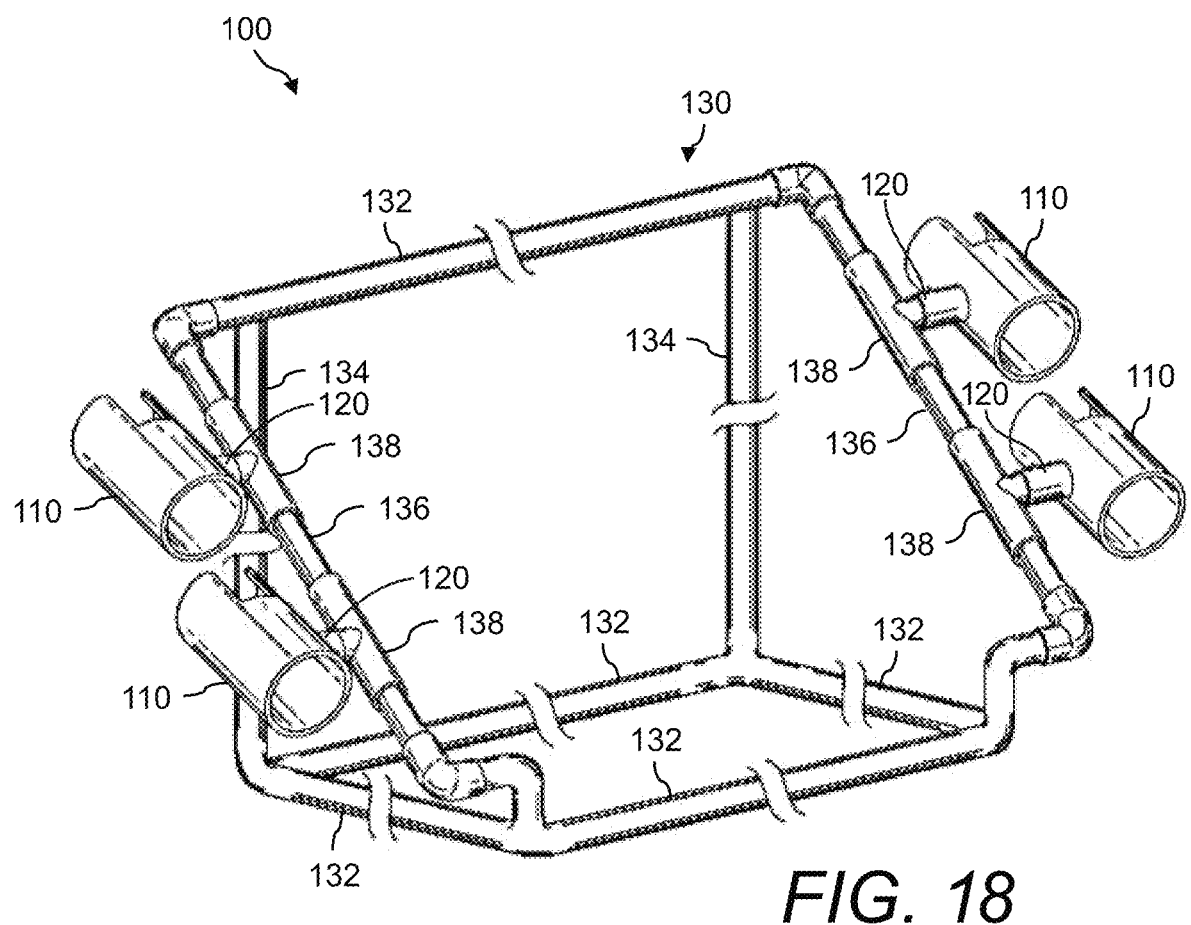
Figure 19:
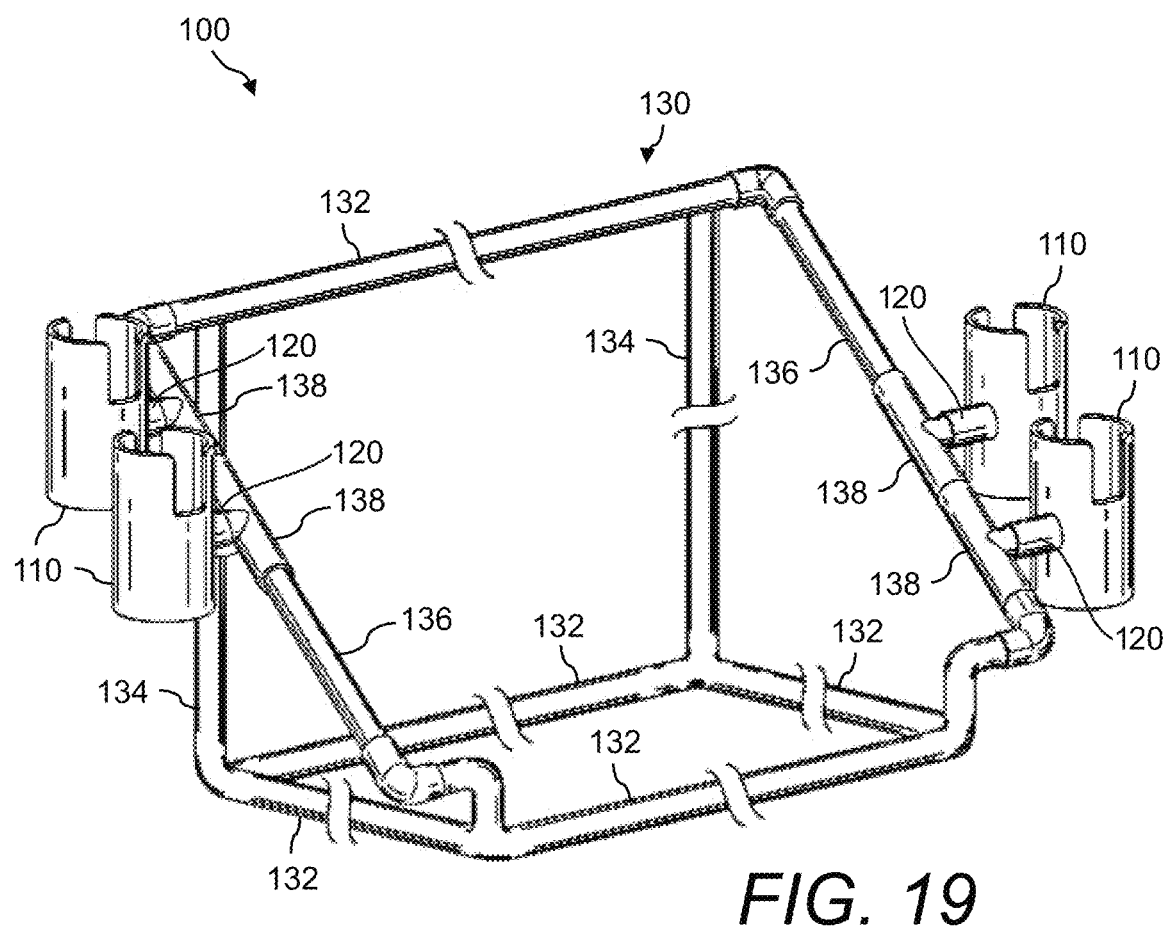
Figure 20:
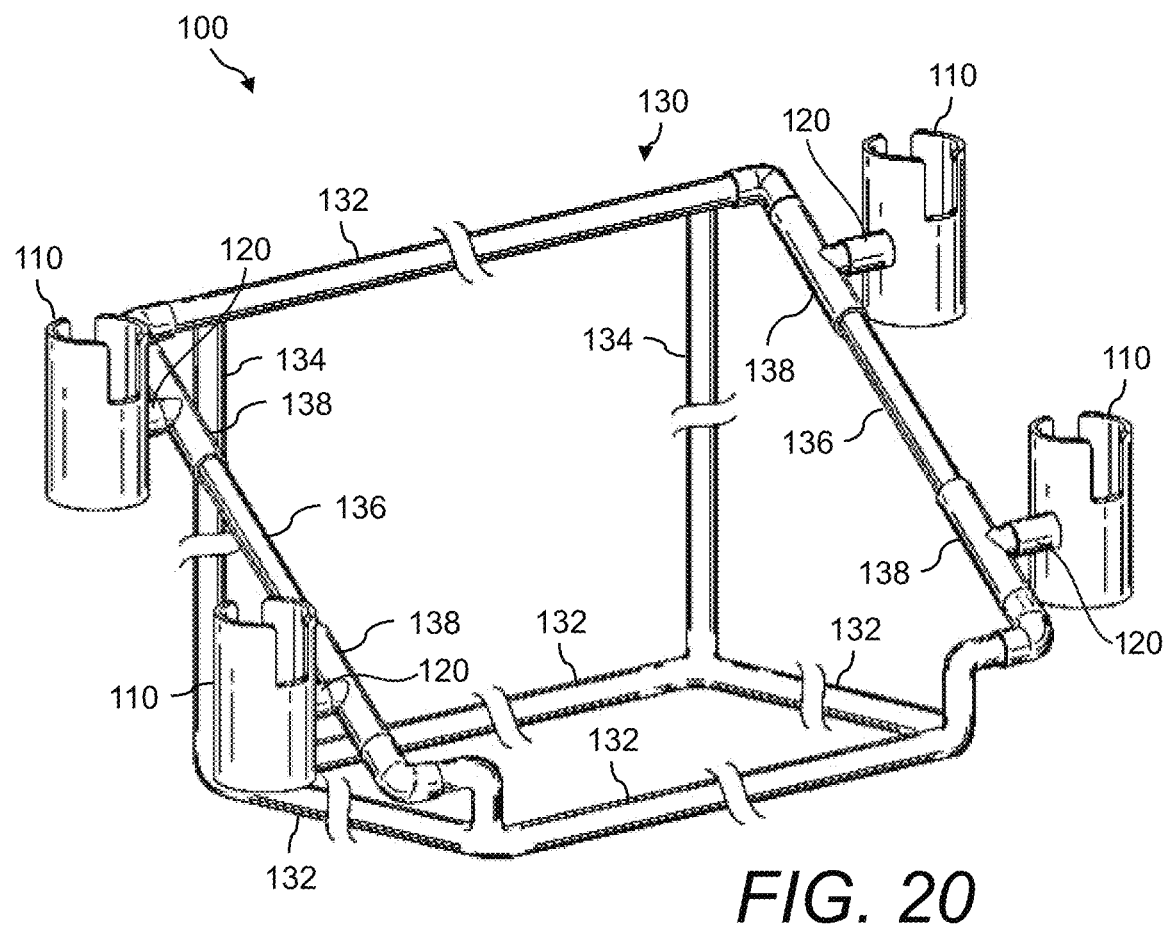
Figure 23:
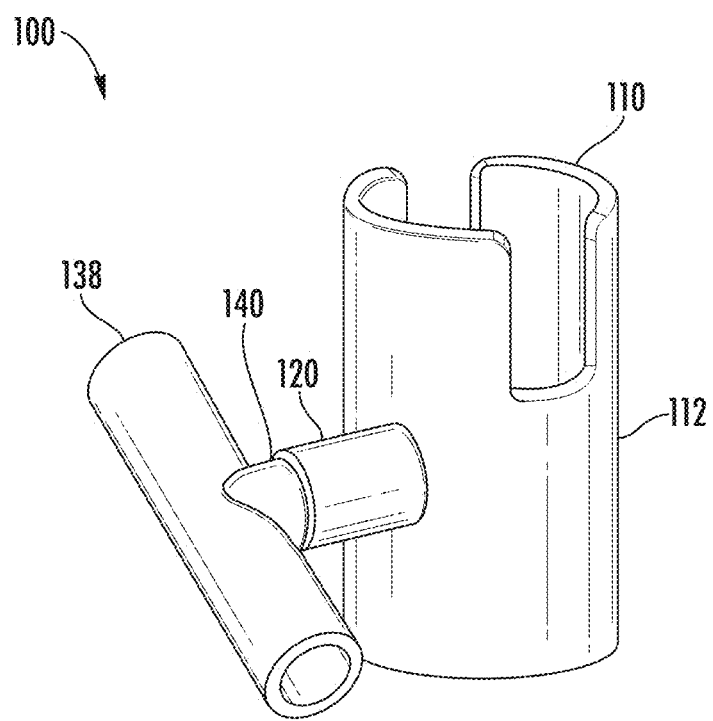
Figure 28A:
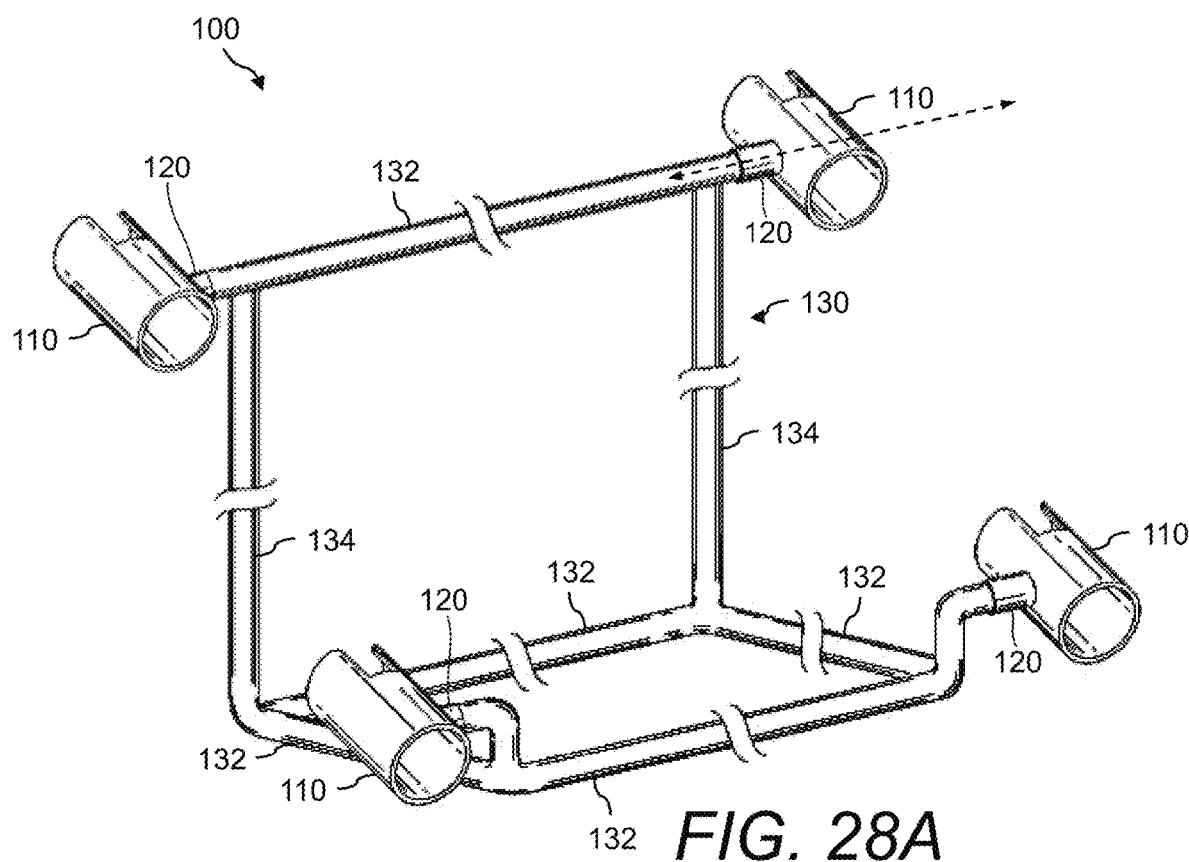
Figure 28B:
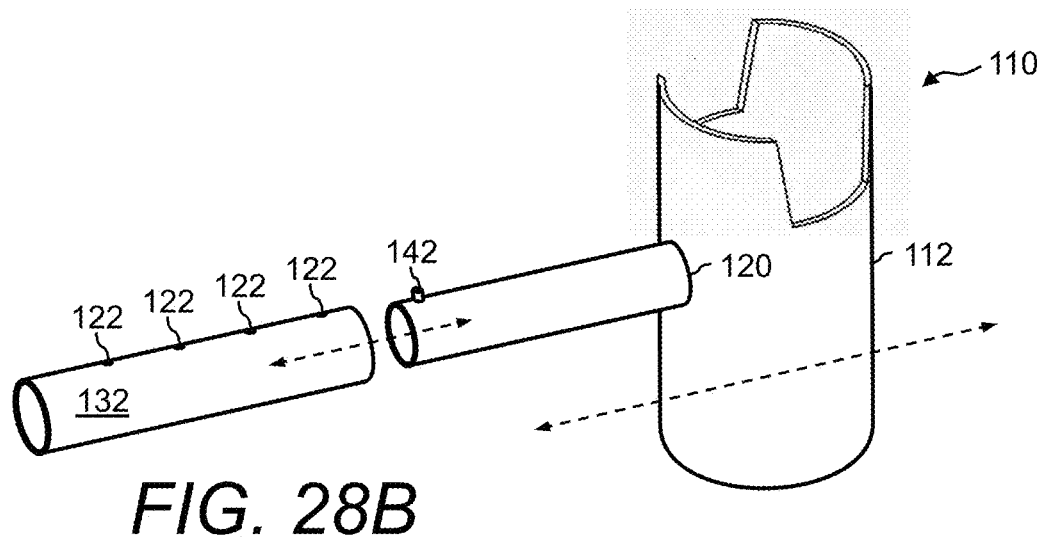
Figure 28C:
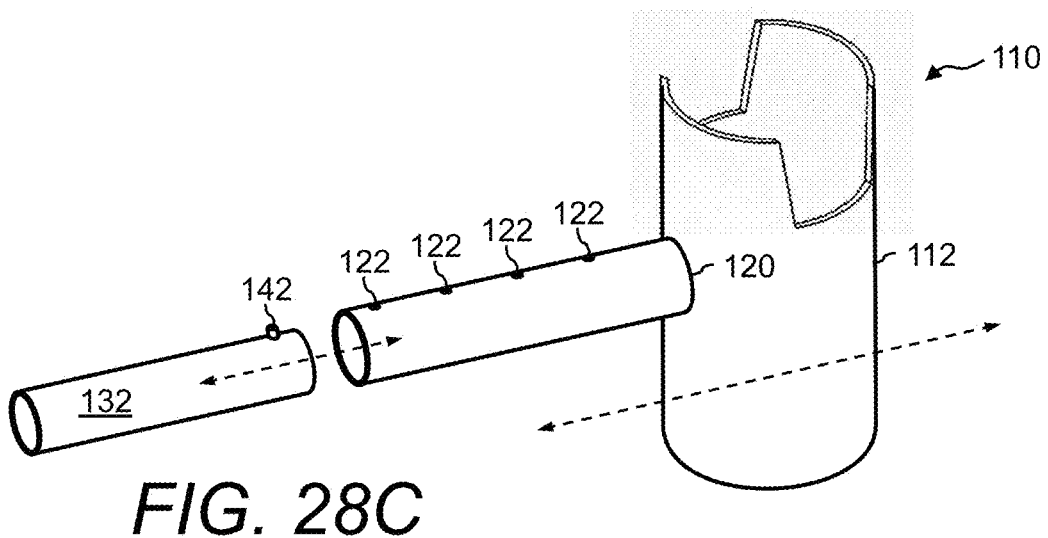
Figure 28D:
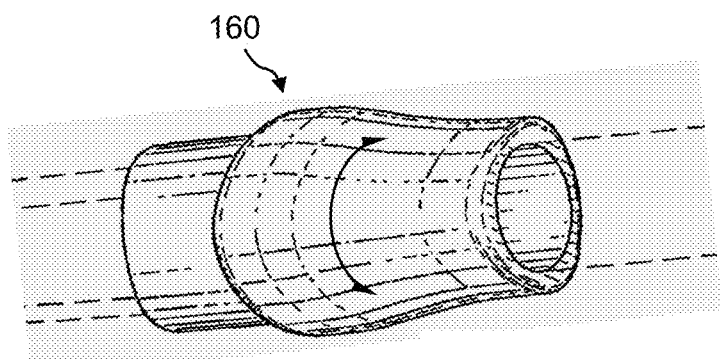
Figure 29:
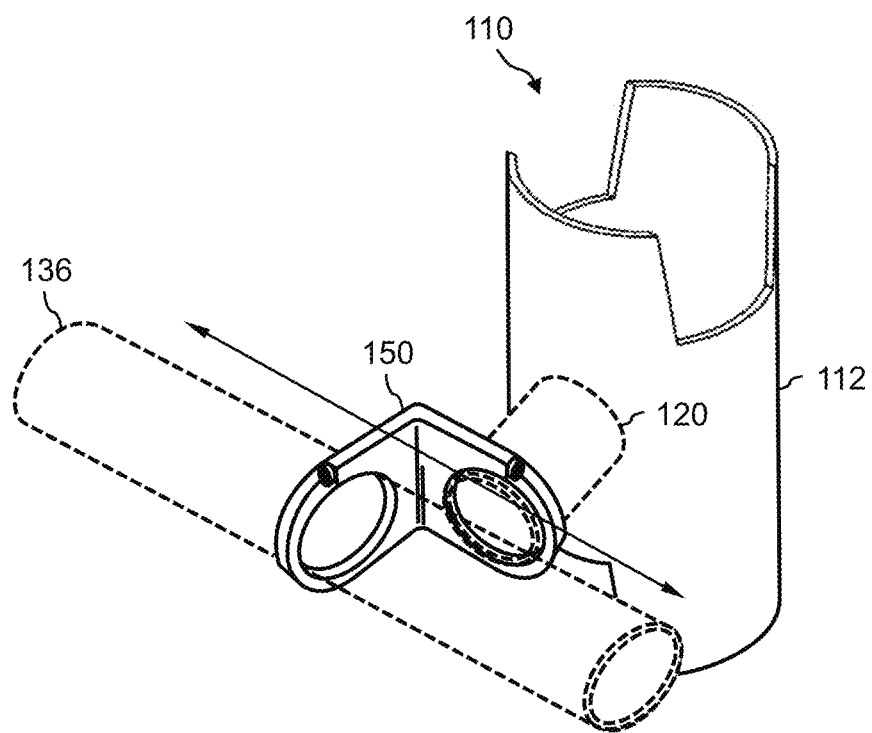
Figure 30:
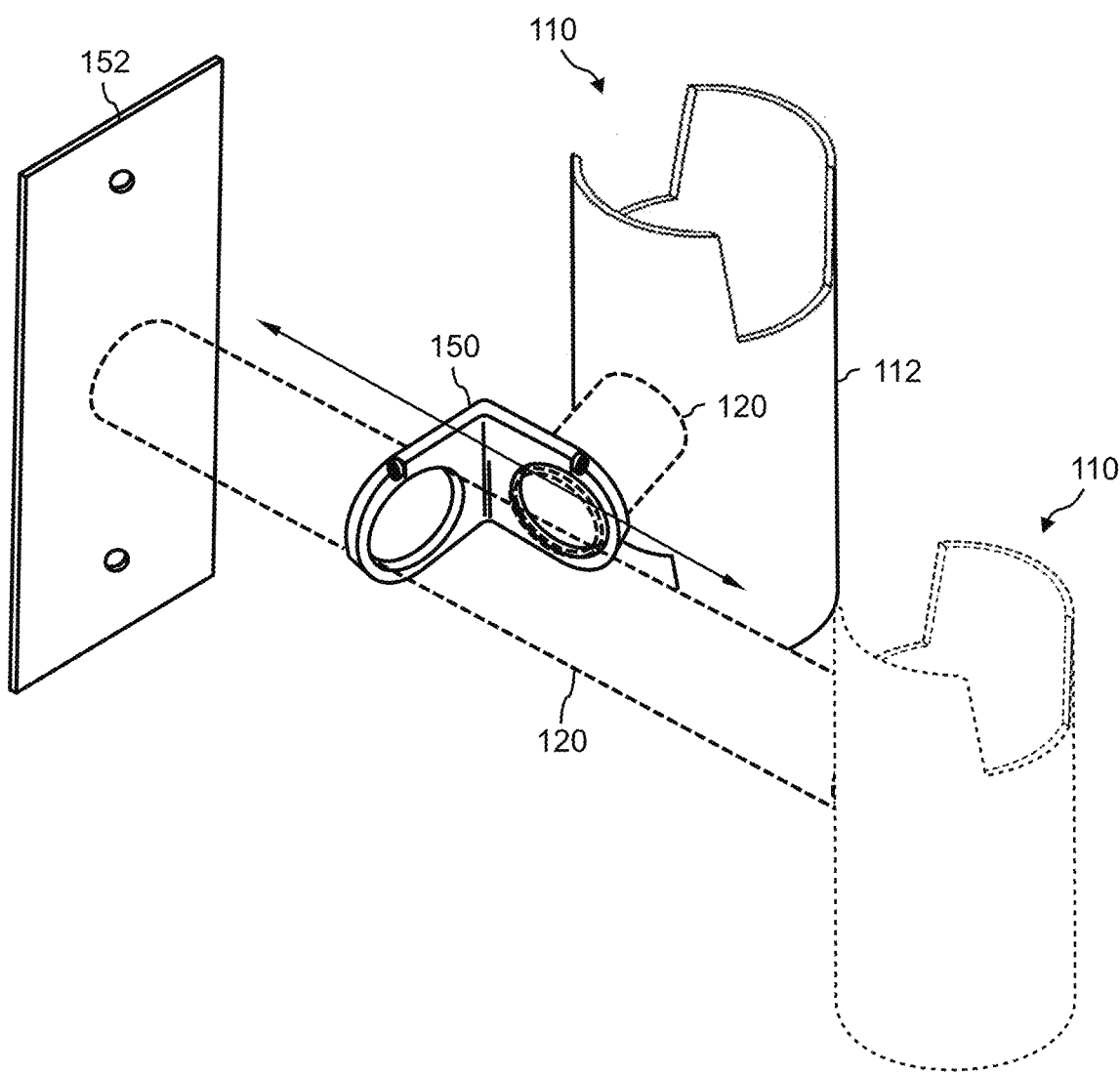
Figure 33A:
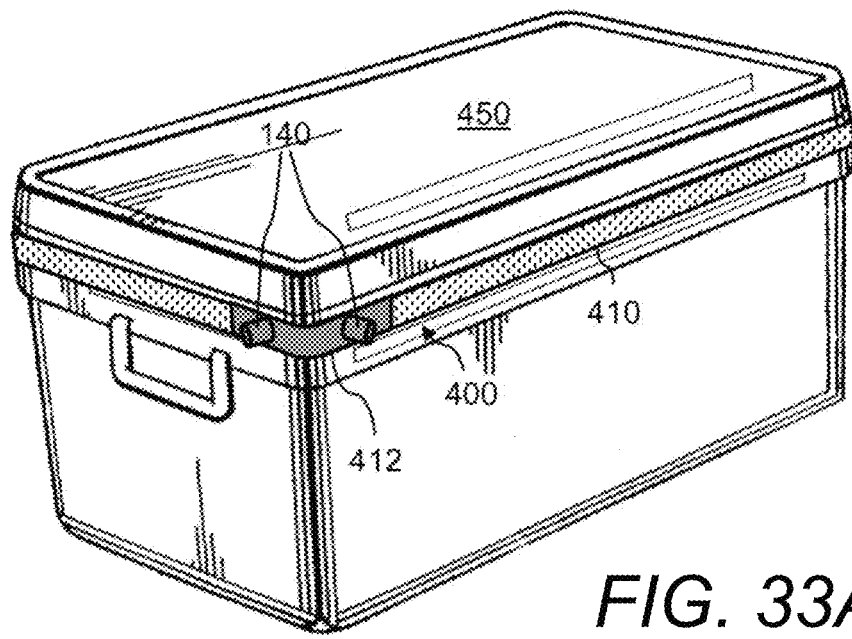
Figure 33B:
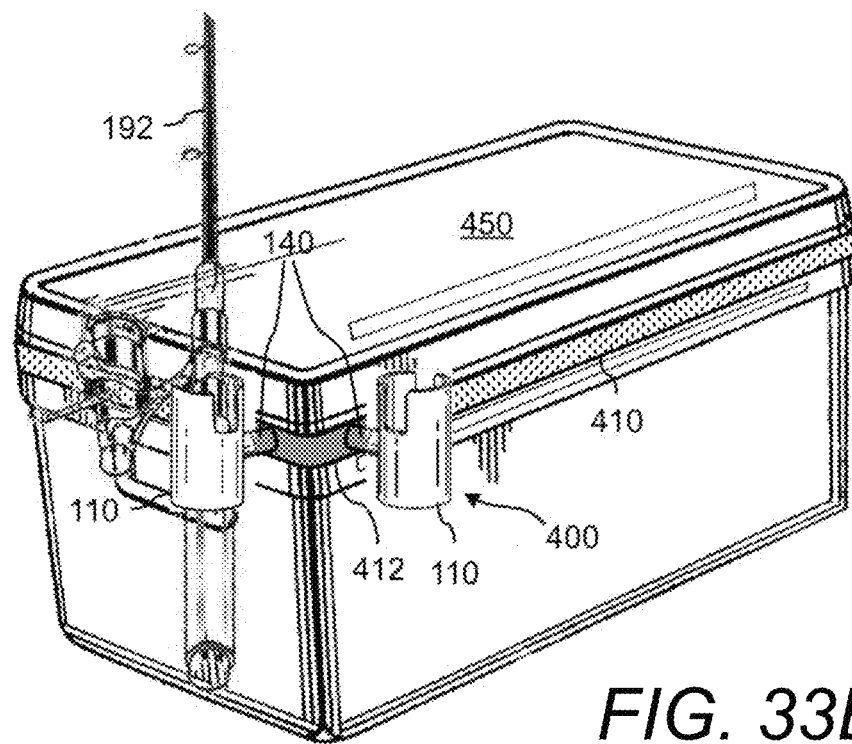
Figure 34:
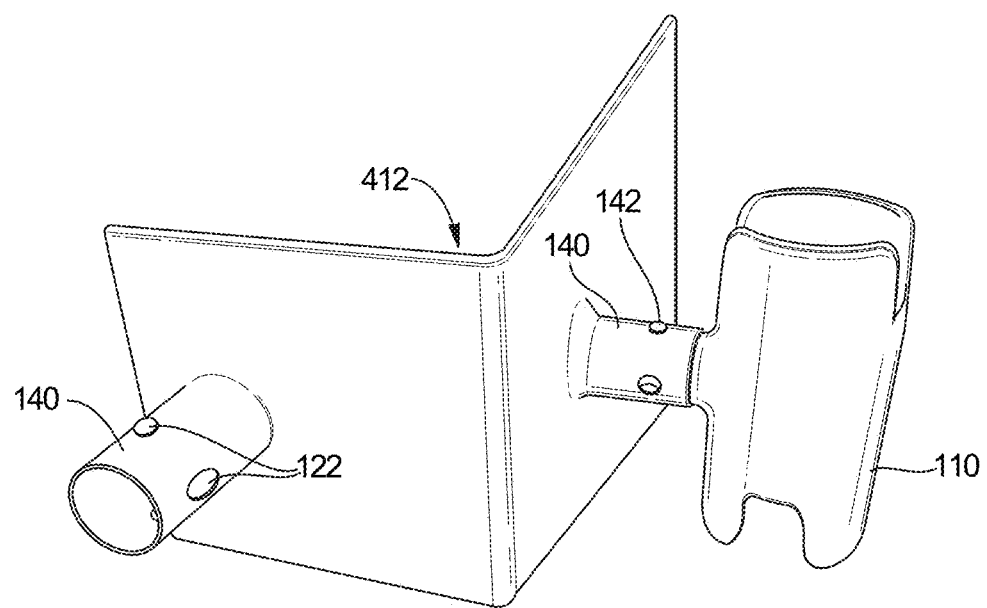
Figure 35:
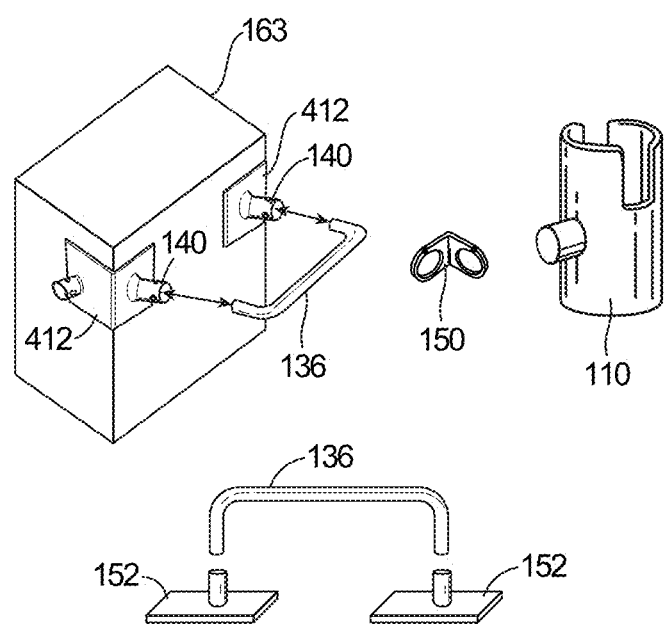
Figure 36:
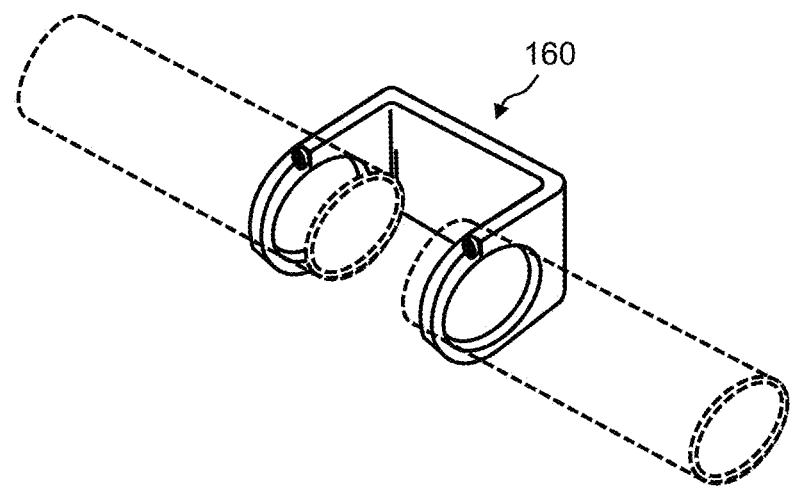
Figure 37:
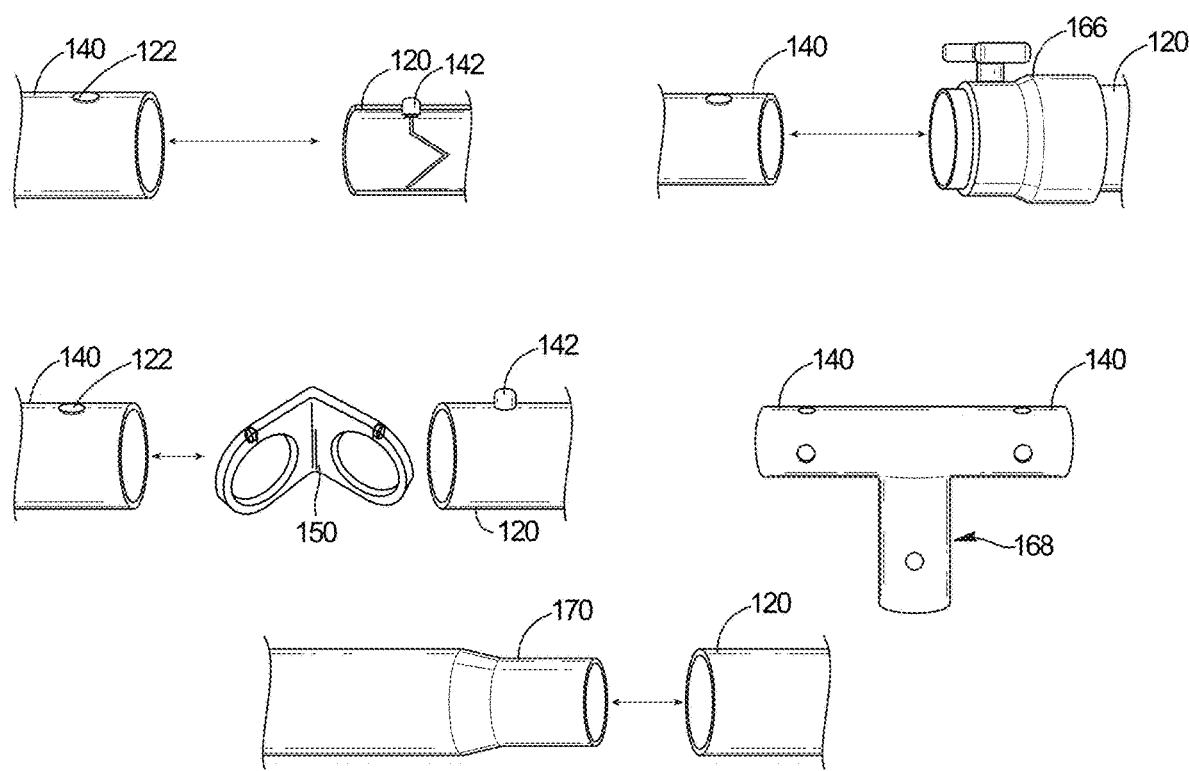
Figure 38:
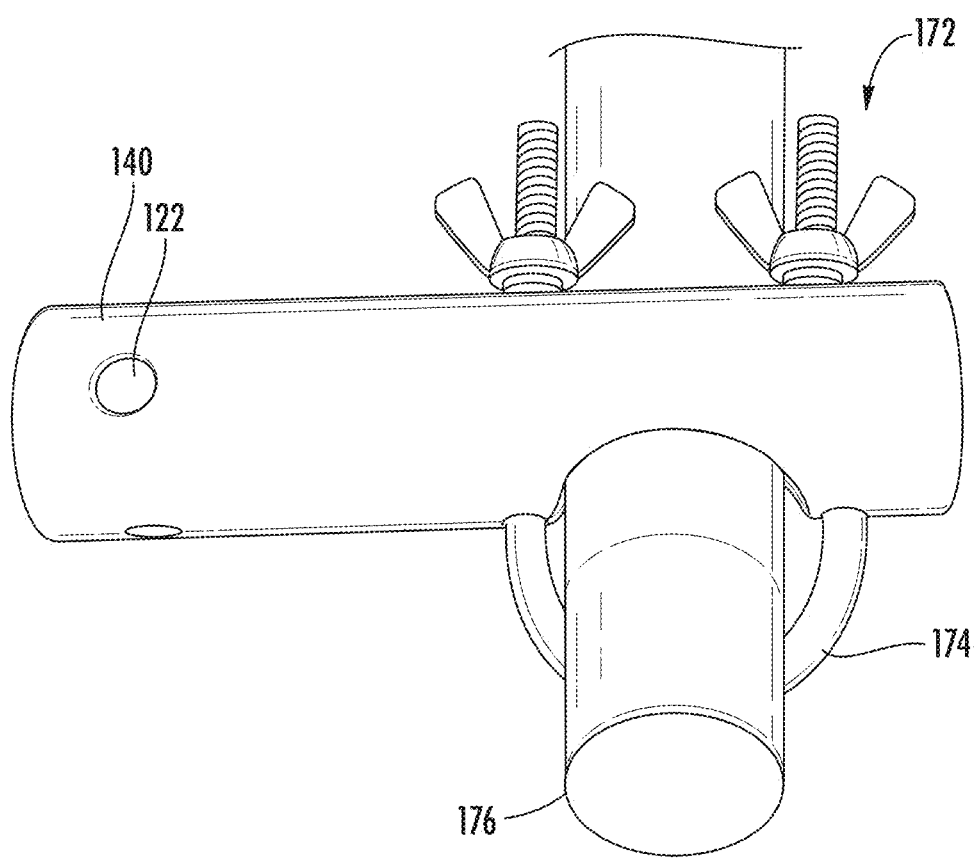
Figure 39A:
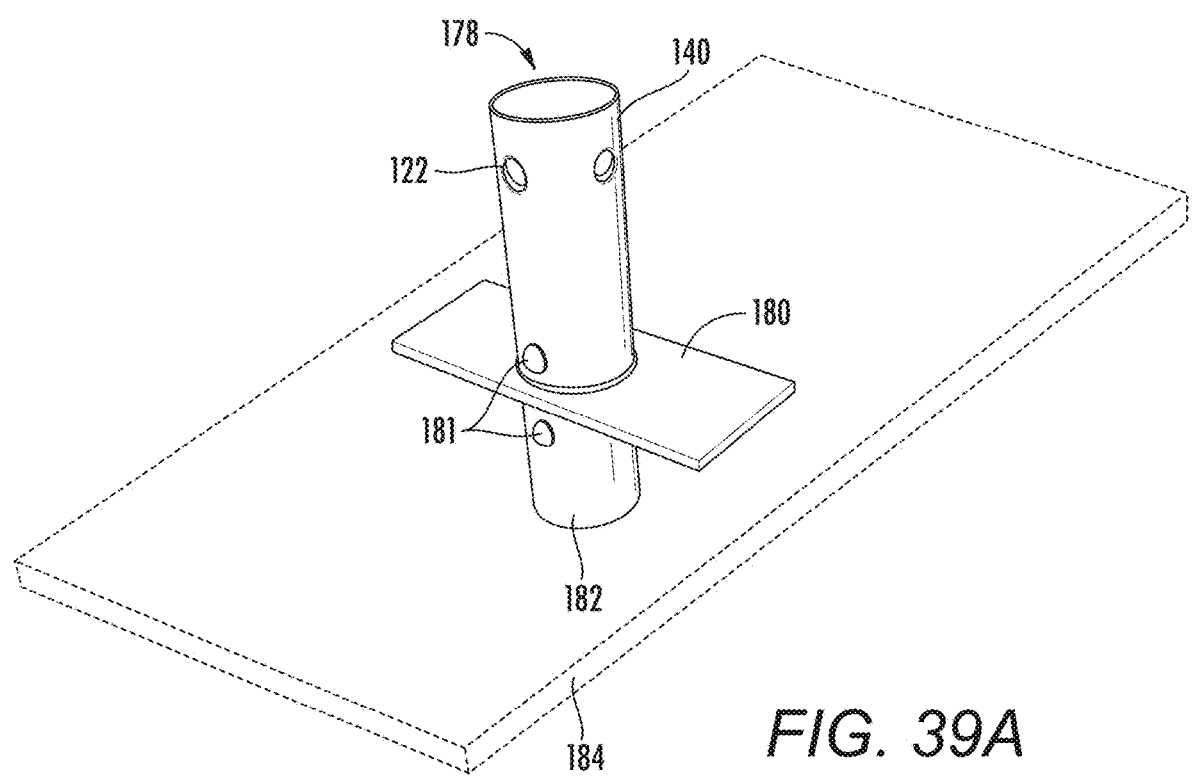
Figure 39B:
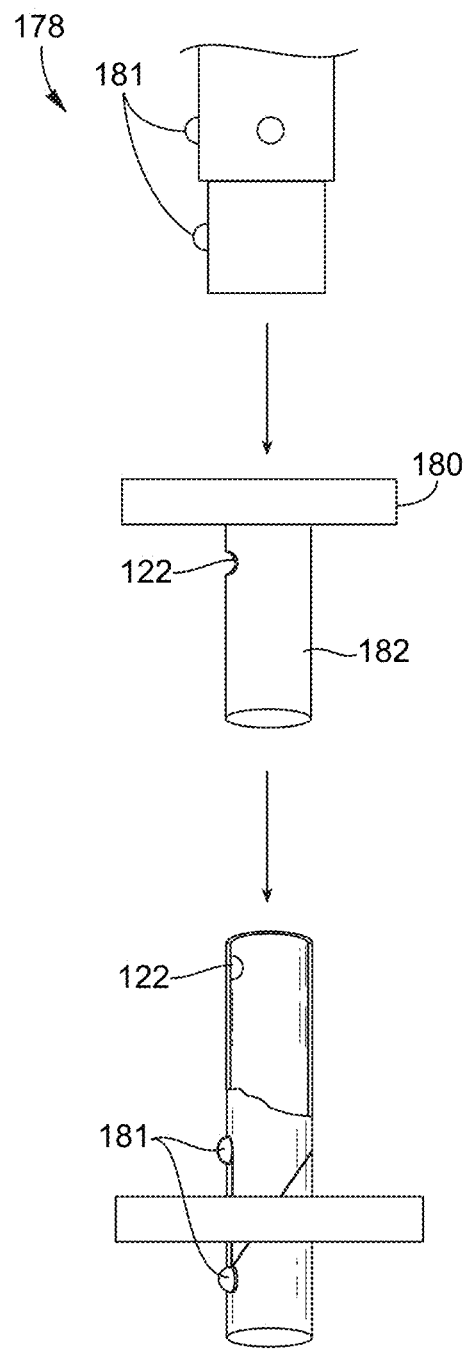
Figure 40A:
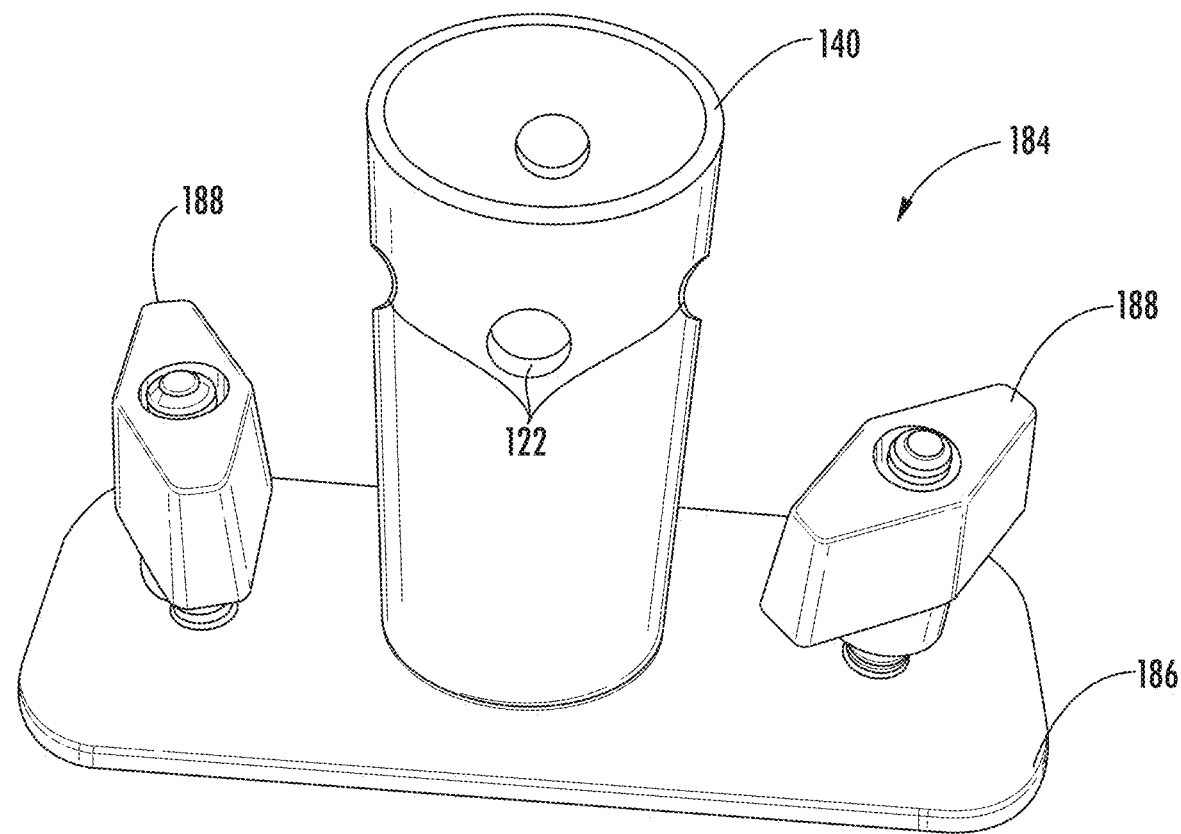
Figure 40B:
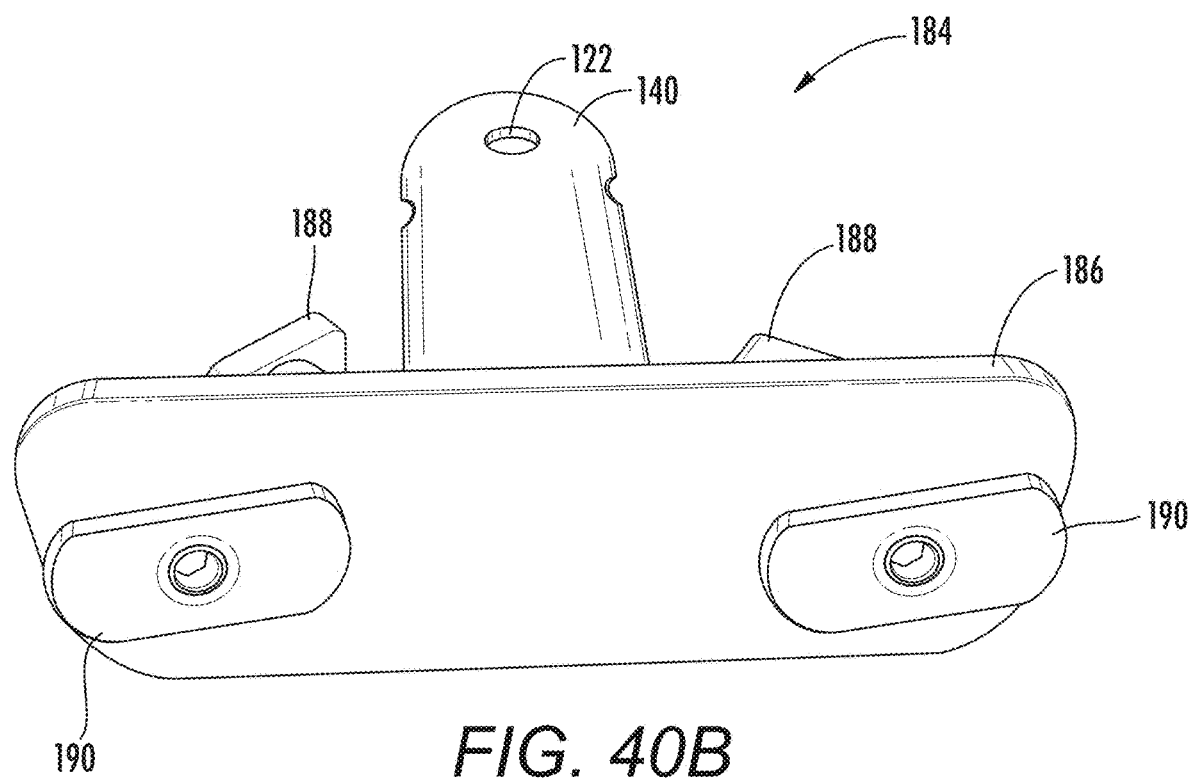
Figure 40C:
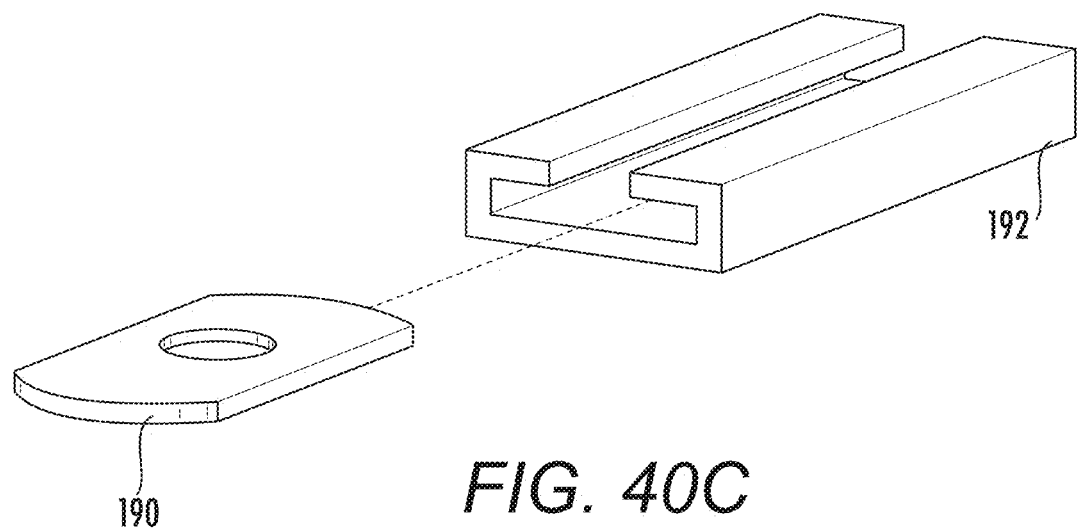

Having thus described the disclosed subject matter in general terms, reference will now be made to the accompanying Drawings, which are not necessarily drawn to scale, and wherein:

FIG. 1 illustrates a perspective view of an example embodiment of the disclosed fishing rod holder system installed inside a pack;

FIG. 2 illustrates another perspective view an example embodiment of the disclosed fishing rod holder system installed inside the pack and when holding fishing rods;

FIGS. 3-9 illustrate various views of example embodiments of the disclosed fishing rod holder system;

FIGS. 10-15 illustrate example embodiments of a rod holding member of the disclosed fishing rod holder system;

FIGS. 16A and 16B illustrate example embodiments of connection mechanisms for attaching the rod holding member to a receiving member of the disclosed fishing rod holder system;

FIGS. 17-22 illustrate perspective views of example embodiments of the disclosed fishing rod holder system including a slide rail;

FIG. 23 illustrates a close up view of a slideable member portion as shown in FIGS. 17-20;

FIGS. 24-28A illustrate various views of additional example embodiments of the disclosed fishing rod holder system;

FIGS. 28B-28D illustrate various views of example embodiments for connecting the rod holding member to the disclosed fishing rod holder system;

FIGS. 29-30 illustrate an example embodiment of a mechanism for connecting the rod holding member to a receiving member of the disclosed fishing rod holder system;

FIGS. 31A-31C and 32A-32B illustrate example embodiments of connecting one or more rod holding members to a receiving member affixed to a flat plate;

FIGS. 33A-33B illustrate example embodiments of connecting one or more rod holding members to a structure via a receiving member affixed to a corner/angled plate;

FIG. 34 illustrates another example embodiment of connecting one or more rod holding members to a receiving member affixed to a corner/angled plate;

FIG. 35 illustrates various example alternative embodiments for connecting the rod holding member to a receiving member of the disclosed fishing rod holder system including a slide rail;

FIG. 36 illustrates an example embodiment of connecting two end portions of members the disclosed fishing rod holder system;

FIG. 37 illustrates example embodiments for connecting the rod holding member to a receiving member of the disclosed fishing rod holder system;

FIG. 38 illustrates an example embodiment of a railing mount receiving member of the disclosed invention;

FIGS. 39A through 39B illustrates an example embodiment of a flush mount receiving member of the disclosed invention; and FIGS. 40A through 40C illustrates an example embodiment of a track mount receiving member of the disclosed invention.

DETAILED DESCRIPTION

The disclosed subject matter now will be described more fully hereinafter with reference to the accompanying Drawings, in which some, but not all embodiments of the disclosed subject matter are shown. Like numbers refer to like elements throughout. The disclosed subject matter may be embodied in many different forms and should not be construed as limited to the embodiments set forth herein; rather, these embodiments are provided so that this disclosure will satisfy applicable legal requirements. Indeed, many modifications and other embodiments of the disclosed subject matter set forth herein will come to mind to one skilled in the art to which the disclosed subject matter pertains having the benefit of the teachings presented in the foregoing descriptions and the associated Drawings. Therefore, it is to be understood that the disclosed subject matter is not to be limited to the specific embodiments disclosed and that modifications and other embodiments are intended to be included within the scope of the appended claims.

In some embodiments, the disclosed subject matter provides a fishing rod holder system for easily transporting, storing, and/or using fishing rods. The fishing rod holder system includes one or more rod holding members wherein the rod holding members may be mounted to a frame, surface, and/or object. The one or more rod holding members may be detachable and rotatable/swivelable about a receiving member. Further, in some embodiments of the fishing rod holder system the positions of the one or more rod holding members can be fixed or adjustable with respect to the frame, surface, and/or object it is mounted to.

The rod holding members may preferably be hollow tubes for receiving the grip end of a fishing rod, wherein the rod holding members may include various configurations of notches and/or slots for engaging with the fishing rod/reel.

In one example, the rod holding members may be mounted to a frame, wherein the frame may be a self-supporting, standalone frame to which the one or more rod holding members may be mounted. In another example, the frame is designed to be secured to/in a secondary structure, wherein the secondary structure can be a portable structure (e.g., a cooler, a lawn chair, a pack, a duffle bag), or the secondary structure can be a substantially permanent structure (e.g., a wall, a tree, a dock or peer, a picnic table, table, the side/railing of any type of watercraft, the side of a pickup truck bed). Further, the frame can be formed, for example, of hollow tubular members, solid members (e.g., solid rods), flat members, and/or any combinations thereof.

Figure 8:
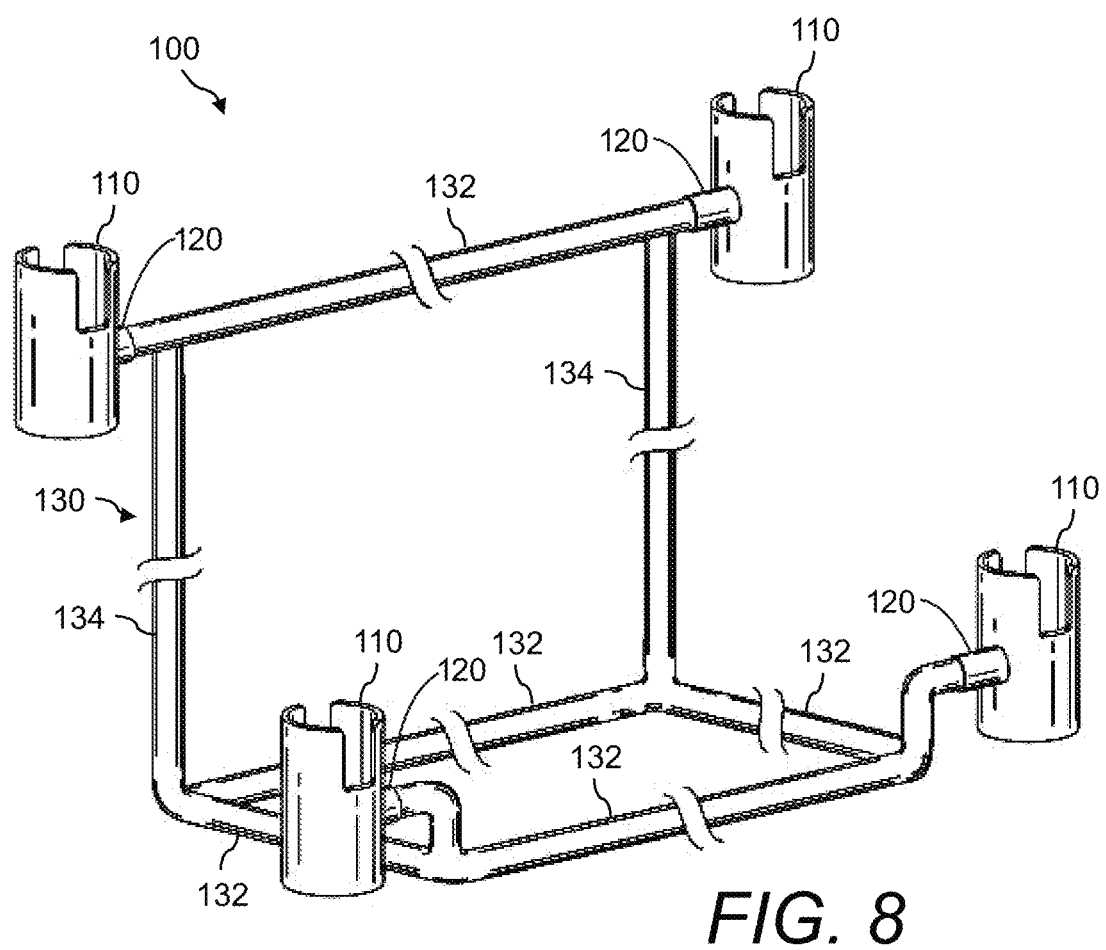
Figure 9:
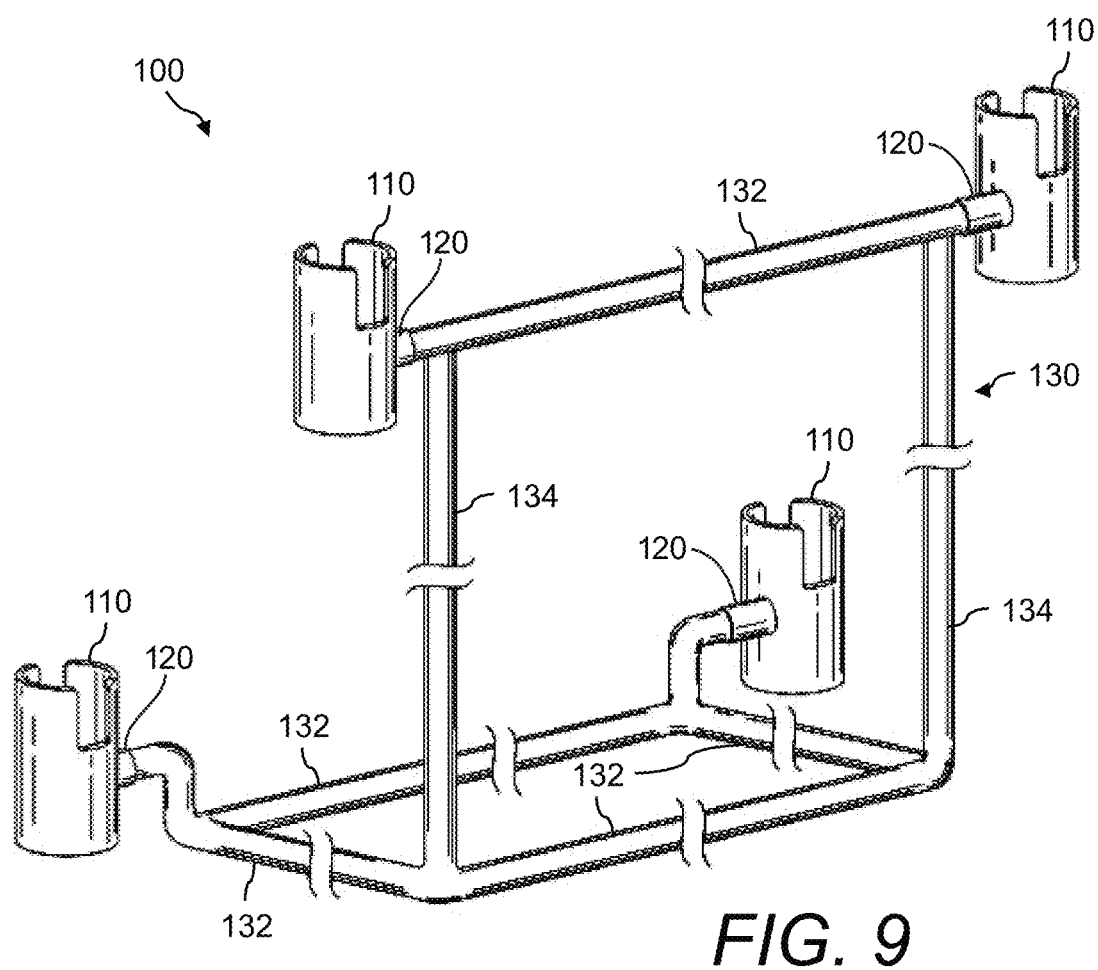

Referring now to FIG. 1 through FIG. 9 is various views of an example of the disclosed fishing rod holder system 100, which is one example of a fishing rod holder system that includes a self-supporting, standalone frame. FIG. 1 is a perspective view of the fishing rod holder system 100 installed inside an example pack 190 and when not holding fishing rods. FIG. 2 a perspective view of the fishing rod holder system 100 installed inside a pack 190 and when holding fishing rods 192. FIG. 3, FIG. 4, FIG. 5, FIG. 6, and FIG. 7 show a front perspective view, a rear perspective view, a top down view, a bottom up view, and a side view, respectively, of the fishing rod holder system 100 of FIG. 1 and FIG. 2. FIG. 8 and FIG. 9 show another front perspective view and rear perspective view of the fishing rod holder system 100 of FIG. 1 and FIG. 2.

The fishing rod holder system 100 is a system for easily transporting, storing, and/or using fishing rods. The fishing rod holder system 100 includes a plurality of rod holders 110, which are the rod holding members of the fishing rod holder system 100. In this example, four rod holders 110 may be mounted on a frame 130, wherein the frame 130 is an example of a self-supporting, standalone frame. The four rod holders 110 are detachable from the frame 130. While FIG. 1 and FIG. 2 show the fishing rod holder system 100 installed inside the pack 190, the fishing rod holder system 100 may be used outside of the pack 190. However, the fishing rod holder system 100 inside the pack 190 provides an easy way to transport multiple fishing rods 192 when, for example, hiking to/from a fishing destination.

Further, while FIG. 1 and FIG. 2 show the fishing rod holder system 100 installed inside a pack (e.g., pack 190), the fishing rod holder system 100 can be configured for use in/on any other portable or fixed structure. For example, the fishing rod holder system 100 can be configured for use in/on any portable structure, such as a cooler, a lawn chair, a pack, a duffle bag, and the like, or in/on any substantially fixed structure, such as a wall, a tree, a dock or peer, a picnic table, the side/railing of any type of watercraft, boat console, side of a pickup truck bed, and the like.

In the example shown in FIG. 1 and FIG. 2, the frame 130 includes an arrangement of horizontal members 132 and vertical members 134, wherein the overall shape of the frame 130 is designed to be fitted inside any conventional pack. In this example, the horizontal members 132 and the vertical members 134 may be formed of hollow, lightweight, rigid, tubular members, such as 1-inch PVC or aluminum tubing. However, the horizontal members 132 and/or the vertical members 134 can be formed, for example, of hollow tubular members, solid members (e.g., solid rods), flat members (see FIGS. 24-26), and any combinations thereof. Further, hollow tubular members are not limited to circular (i.e., piping). Rather, the hollow tubular members can be, for example, square tubing (i.e., hollow tubing with square cross-section) or rectangular tubing (i.e., hollow tubing with rectangular cross-section).

Absent the rod holders 110, the ends of certain horizontal members 132 may protrude through openings or slots in the sides of, for example, the pack 190. Once the frame 130 is inside the pack 190, the rod holders 110 can be mounted on the exposed ends of the horizontal members 132. Accordingly, the rod holders 110 are outside of the pack 190.

Each of the rod holders 110 may be a piece of tubing, such as about a 4-inch long piece of tubing, designed to receive the handle end of a fishing rod, as shown for example in FIG. 2. One or more notches and/or slots may be provided in one or more sides of the rod holders 110, wherein the neck of a fishing reel may engage with one of the notches and/or slots. A connecting member 120 is provided on the side of each of the rod holders 110, wherein the connecting member 120 can be fitted to the frame 130, such as to the ends of the horizontal members 132. For example, the connecting member 120 can be a short piece of tubing having an inside diameter that is substantially the same as the outside diameter of the horizontal members 132. In another example, the connecting member 120 can be a short piece of tubing having an outside diameter that is substantially the same as the inside diameter of the horizontal members 132. More details of examples of different designs of the rod holders 110 are shown and described herein below with reference to FIGS. 10-16B.

The rod holders 110 may be rotatable/adjustable about the ends of the horizontal members 132. For example, FIGS. 1 and 3-7 show the axis of the rod holders 110 set at an angle (e.g., about 45 degrees) with respect to vertical. By contrast, FIGS. 2 and 8-9 show the axis of the rod holders 110 set at about vertical. The rotational positions of the rod holders 110 about the ends of their respective horizontal members 132 can be the same or different. In one example, the two rod holders 110 on one side can be set to about 45 degrees while the two rod holders 110 on the other side can be set to about vertical. In another example, the two lower rod holders 110 can be set to about 45 degrees while the two upper rod holders 110 can be set to about vertical. In yet another example, the two lower rod holders 110 can be set to about 45 degrees in one direction (i.e., +45 degrees) while the two upper rod holders 110 can be set to about 45 degrees in the opposite direction (i.e., −45 degrees).

In the fishing rod holder system 100 shown in FIG. 1 through FIG. 9, the horizontal/vertical mounting positions of the four rod holders 110 is fixed with respect to the frame 130. However, in other embodiments the horizontal/vertical positions of the rod holders 110 may be adjustable, an example of which is shown in FIGS. 17-22.

FIGS. 10-16B illustrate various views of multiple examples of the rod holder 110 of the disclosed fishing rod holder system 100. The rod holder 110 may include any arrangement of notches and/or slots, examples of which are shown in FIG. 10-15.

Figure 10:
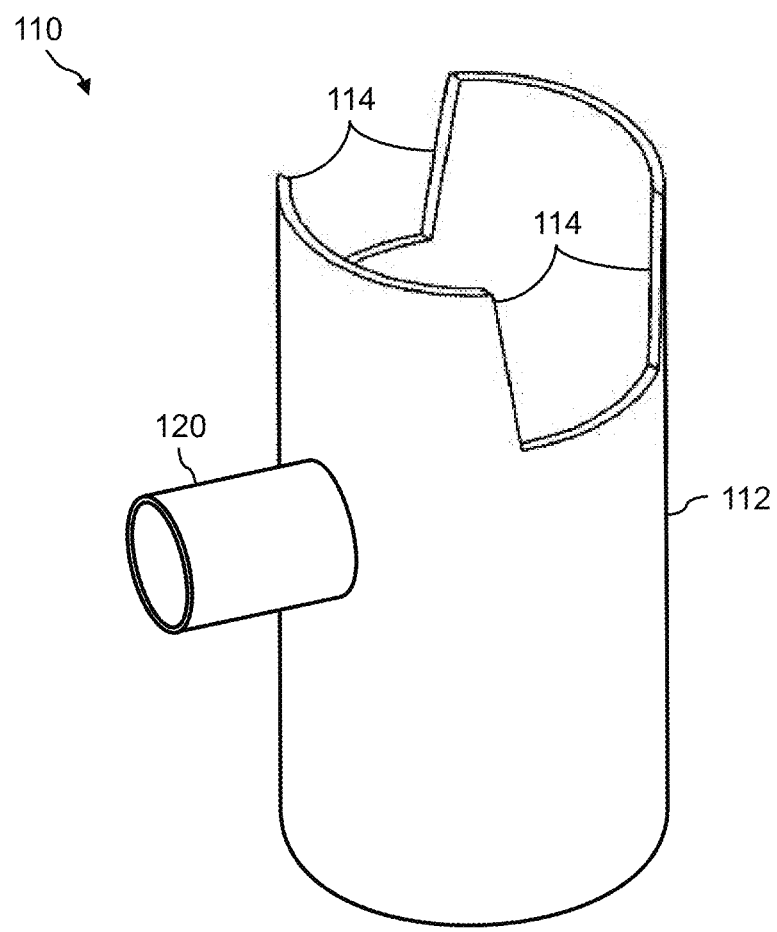
Figure 11:
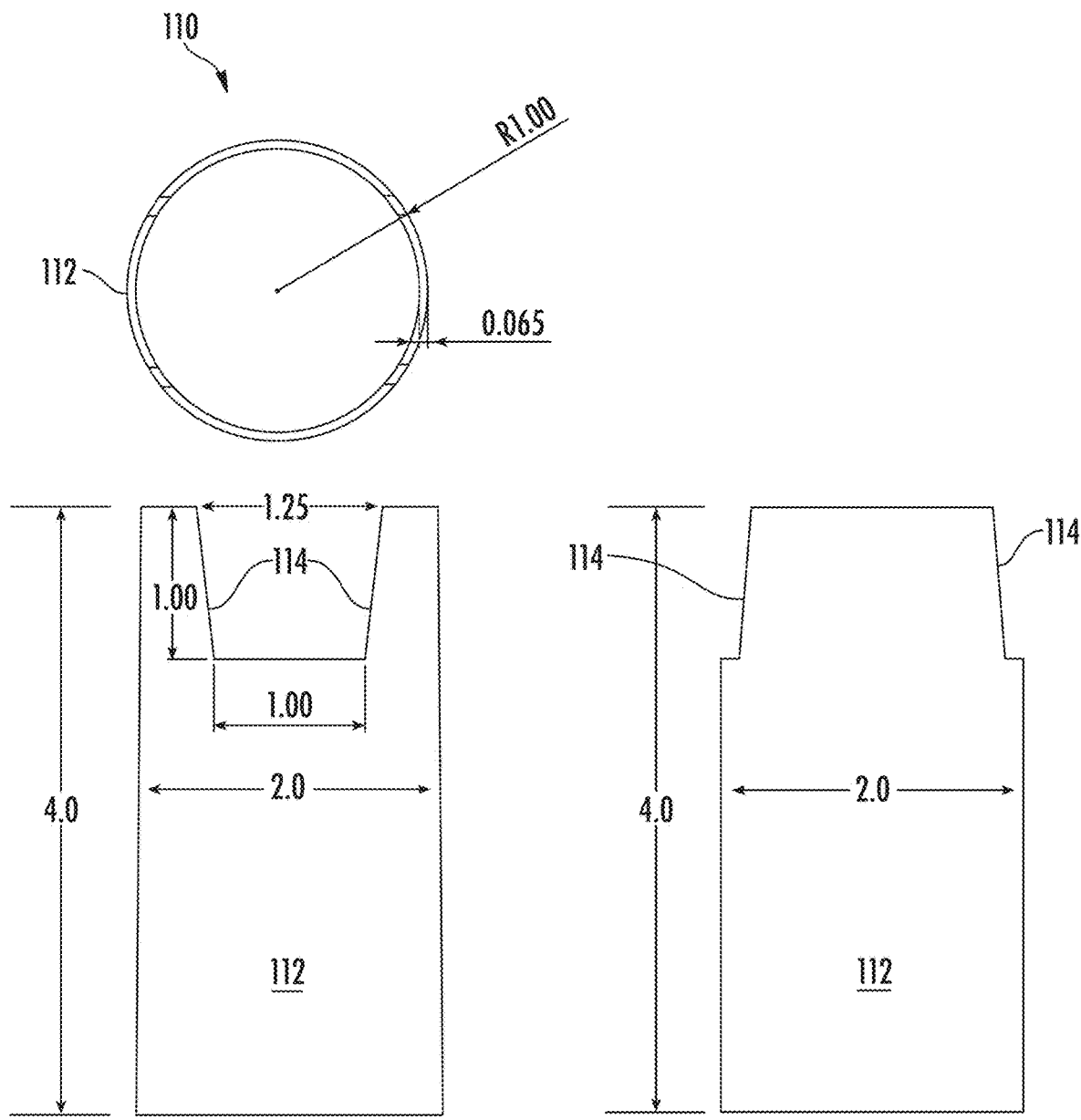

For example, FIGS. 10 and 11 show an example of the rod holder 110 wherein the rod holder 110 includes a body 112 and a connecting member 120. In one example, the body 112 of the rod holder 110 is a length of hollow tubing (e.g., PVC, aluminum, or stainless steel tubing) that is, for example, about 4 inches long and about 2 inches in diameter (see for example FIG. 11). Further, the thickness of the body wall may be, for example, about 0.065 inches. Further, in this example, a pair of opposing notches 114 is provided at one end of the body 112. In one example and referring now to FIG. 11, each of the notches 114 may be about 1 inch deep and may be about 1.25 inches wide, then may taper to about 1 inch wide.

In this example, the connecting member 120 is also a tubular member (e.g., about a 1-inch tubular member). The connecting member 120 protrudes from a side of the body 112 and is substantially normal to the body 112. In one example, the connecting member 120 can have an outside diameter that is substantially the same as the inside diameter of the horizontal members 132, wherein the connecting member 120 is fitted inside the horizontal member 132 (see FIG. 16A). However, in another example, the connecting member 120 can have an inside diameter that is substantially the same as the outside diameter of, for example, the horizontal members 132 shown in FIGS. 1-9, wherein the connecting member 120 is fitted around the outside of the horizontal member 132 (see FIG. 16B).

Figure 12:
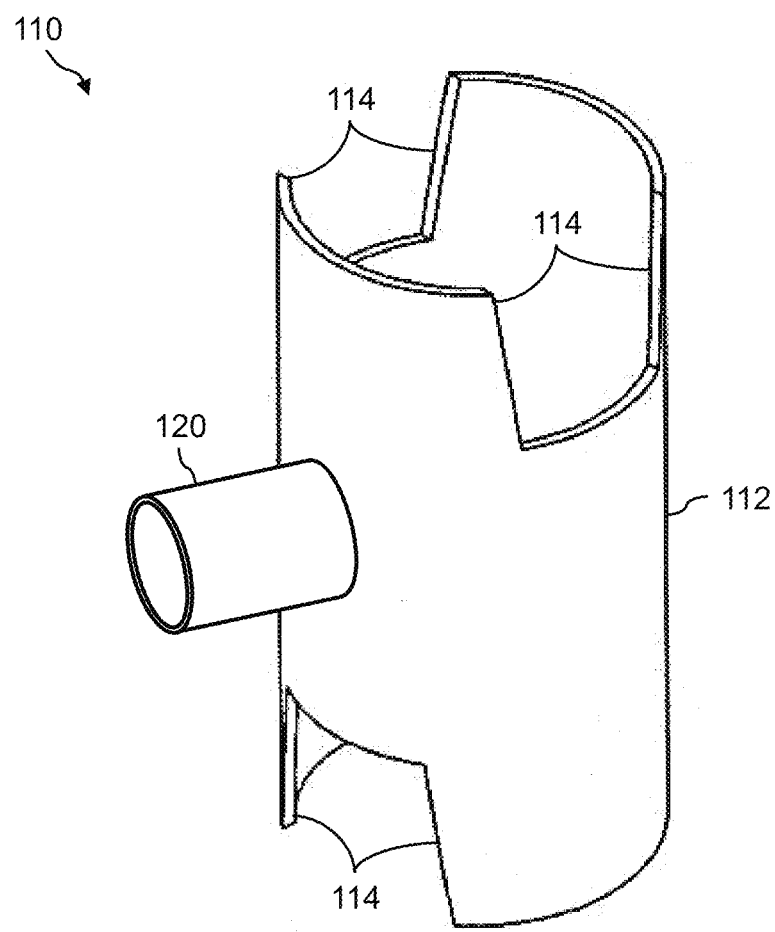
Figure 13:
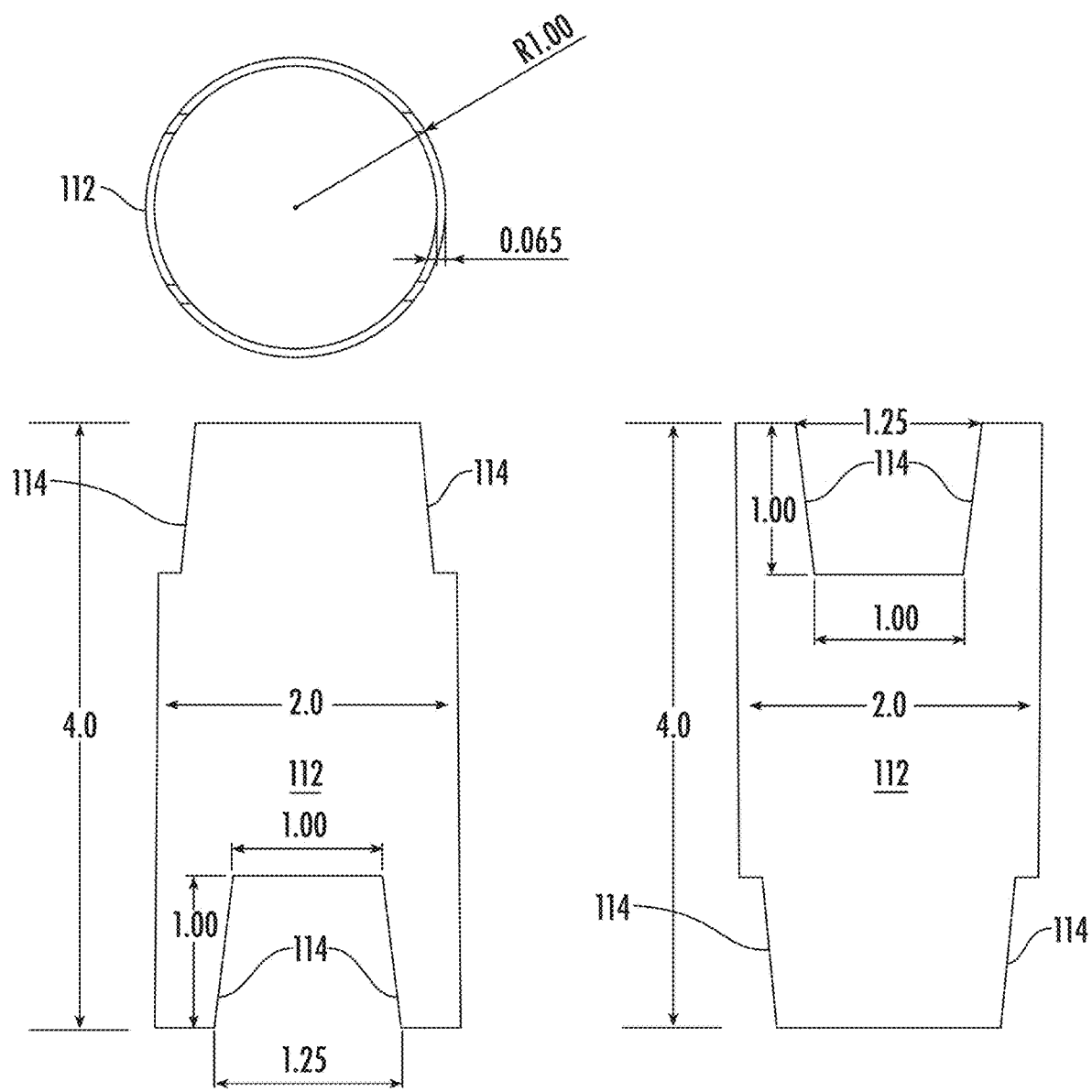

Referring now to FIGS. 12 and 13 is yet another example of the rod holder 110 wherein a pair of opposing notches 114 may be provided at both ends of the body 112. However, the first pair of opposing notches 114 at one end of the body 112 is arranged about 90 degrees out of phase with the second pair of opposing notches 114 at other end of the body 112.

Figure 14:
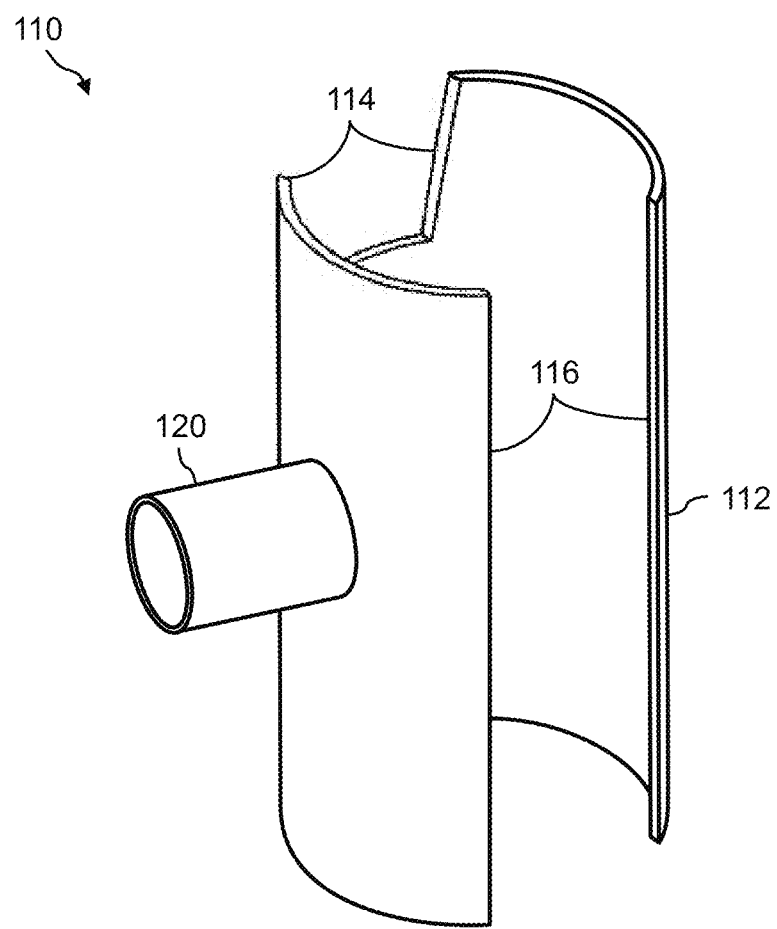

Referring now to FIG. 14 is yet another example of the rod holder 110 wherein the body 112 includes one notch 114 at one end (or at both ends) and a full length slot 116 on the opposing side of the body 112. The width of the slot 116 can be, for example, in the range of about 1 inch to about 1.25 inches.

Figure 15:
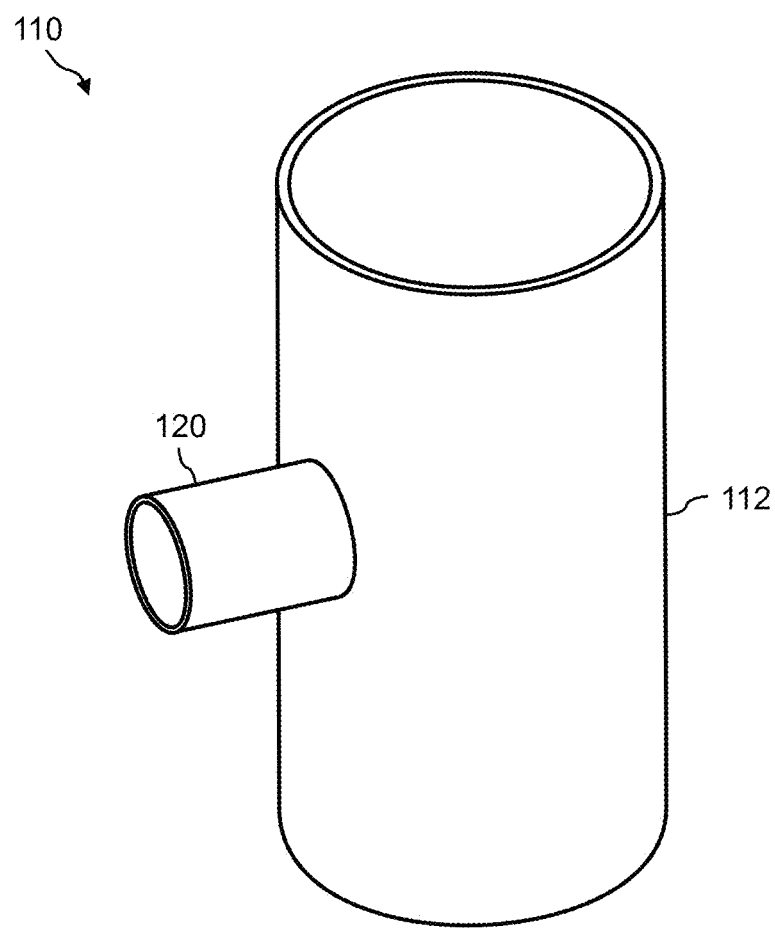

Referring now to FIG. 15 is yet another example of the rod holder 110 wherein the body 112 includes no notches or slots.

Referring now to FIG. 16A and FIG. 16B is yet another example of the rod holder 110 wherein the connecting member 120 may include a mechanism for setting and locking the rotational position of the rod holder 110 with respect to a receiving member. For example, FIG. 16A and FIG. 16B show a receiving member 140, which can be, for example, the ends of one or more of the horizontal members 132, e.g., as shown in FIGS. 1-9 and 24-28A, or alternatively, may be affixed to another mounting surface or mechanism, e.g., as shown in FIGS. 31A-35, 38-40B.

In the example shown in FIG. 16A, the receiving member 140 is sized to fit outside (around) the connecting member 120. For example, if the outside diameter of the connecting member 120 of the rod holder 110 is about 1 inch, then the inside diameter of the receiving member 140 is also about 1 inch. In this example of the rod holder 110, the connecting member 120 can be called an inside-fitting connecting member 120.

A spring-loaded snap clasp system may be provided to attach the connecting member 120 and the receiving member 140, wherein a spring-loaded button 142 may be provided in the connecting member 120 of the rod holder 110 and a set of through-holes 122 is provided in the receiving member 140. There may be one or more through-holes 122 spaced about 45 degrees, 90 degrees, or some other number of degrees apart around the circumference of the receiving member 140, or a portion thereof. For example, the receiving member 140 may include eight through-holes 122 positioned about 45 degrees apart around the circumference of the receiving member 140, as shown in Detail A of FIG. 16A. Or in another example, the receiving member 140 may include four through-holes 122 positioned about 90 degrees apart around the circumference of the receiving member 140. The spring-loaded button 142 can be aligned with and locked into any one of the through-holes 122 to set the desired rotational position of the rod holder 110 about the receiving member 140.

By contrast, in the example shown in FIG. 16B, the receiving member 140 is sized to fit inside the connecting member 120. For example, if the inside diameter of the connecting member 120 of the rod holder 110 is about 1 inch, then the outside diameter of the receiving member 140 is also about 1 inch. In this example of the rod holder 110, the connecting member 120 can be called an outside-fitting connecting member 120. In this example, the spring-loaded button 142 is provided in the receiving member 140 and the set of through-holes 122 is provided in the connecting member 120 of the rod holder 110.

In another example, the rotating feature of the rod holder 110 with respect to the receiving member 140 can be provided via a turn lock coupler (e.g. 166 of FIG. 37), cam lock coupler (see FIG. 28D), or pressure fit. Further, any configurations of the disclosed fishing rod holder system that are described herein can include outside-fitting connecting members 120 of the rod holders 110, inside-fitting connecting members 120 of the rod holders 110, or a combination of both outside-fitting and inside-fitting connecting members 120 of the rod holders 110.

FIGS. 17-22 illustrate perspective views of another example of the disclosed fishing rod holder system 100 wherein the horizontal and/or vertical positions of the rod holders 110 are adjustable. In one example, the fishing rod holder system 100 is substantially the same as that shown in FIGS. 1-9 except for the additions of one or more rail members 136, on one or both sides (as shown in FIGS. 17-20). Further, in this example, the rod holders 110 may be mounted to corresponding slideable members 138 (or 90-degree ring clamps 150), that can ride along the rail members 136; for example, two slideable members 138 may be on each rail member 136. In this example, the position of each of the rod holders 110 can be adjusted by sliding its respective slideable member 138 along the length of the rail member 136. FIGS. 17-20 also show the rod holders 110 set at different angles and/or at different positions along their respective rail member 136. Further, in this example, the pack 190 would have a slot on one or both sides, as necessary, that corresponds to the path of the slideable member 138.

Figure 21A:
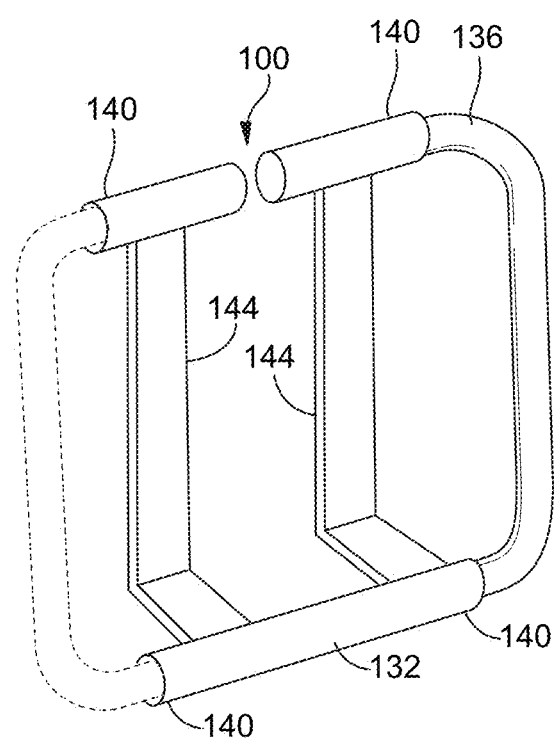
Figure 21B:
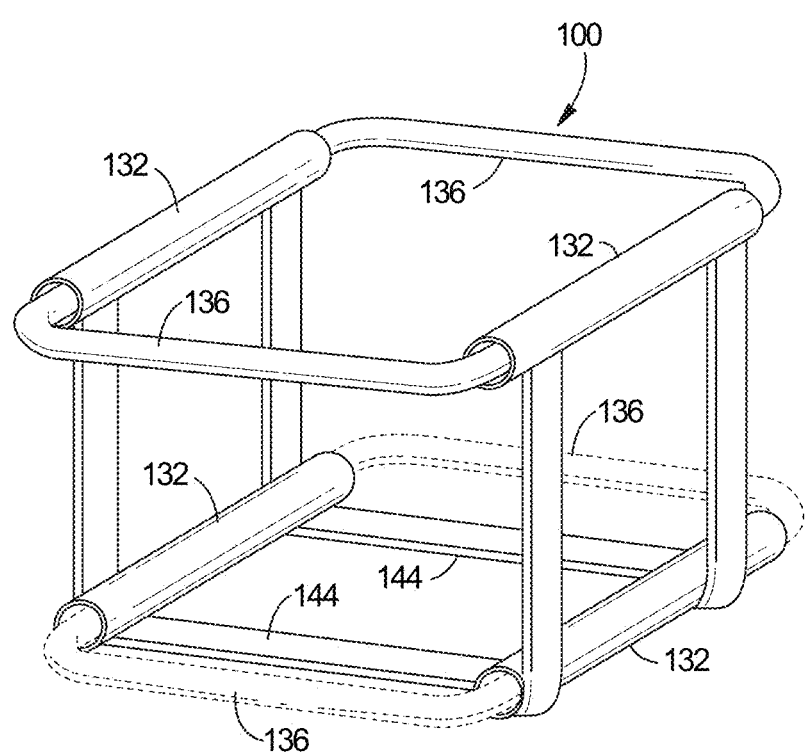
Figure 22:
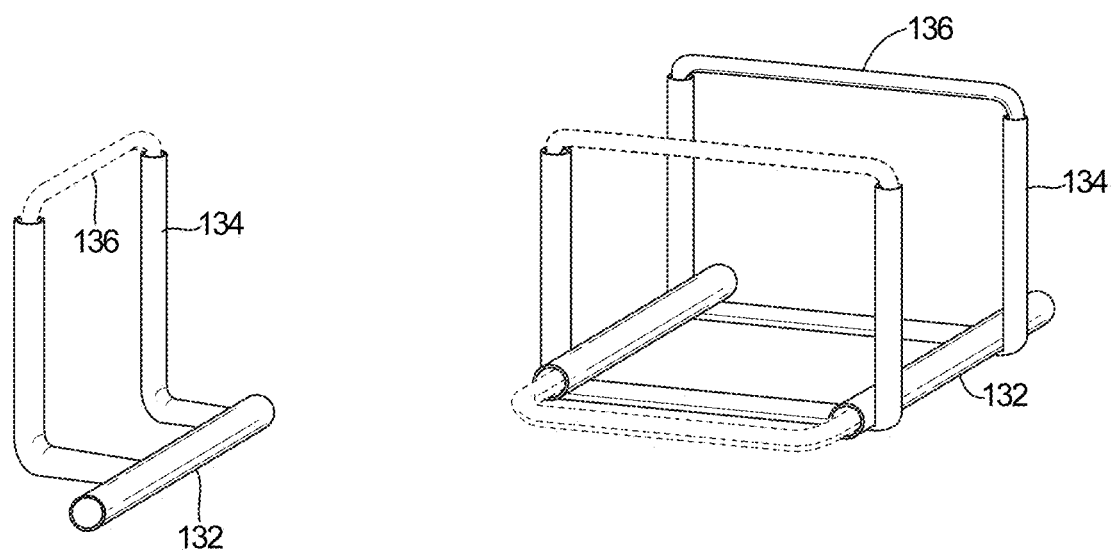

FIGS. 21A-22 illustrate alternative embodiments of the disclosed fishing rod holder system 100 wherein the horizontal and/or vertical positions of the rod holders 110 may be adjustable. In these examples, the rail members 136 may be positioned in various configurations, e.g., from an upper portion of the frame 130 diagonally downward to a lower portion of the frame 130 (See FIG. 21A), and/or horizontally spanning between opposing upper or lower portions of frame 130 (See FIGS. 21B-22). In this example, the rod holders 110 may be mounted to corresponding slideable members 138 (or 90-degree ring clamps 150) that ride along the rail members 136.

Referring now to FIG. 23 is a close up view of the slideable member 138 shown in FIGS. 17-20 and with the rod holder 110 connected thereto. In this example, the receiving member 140 may protrude from a side of the slideable member 138 to engage with connecting member 120.

Figure 24:
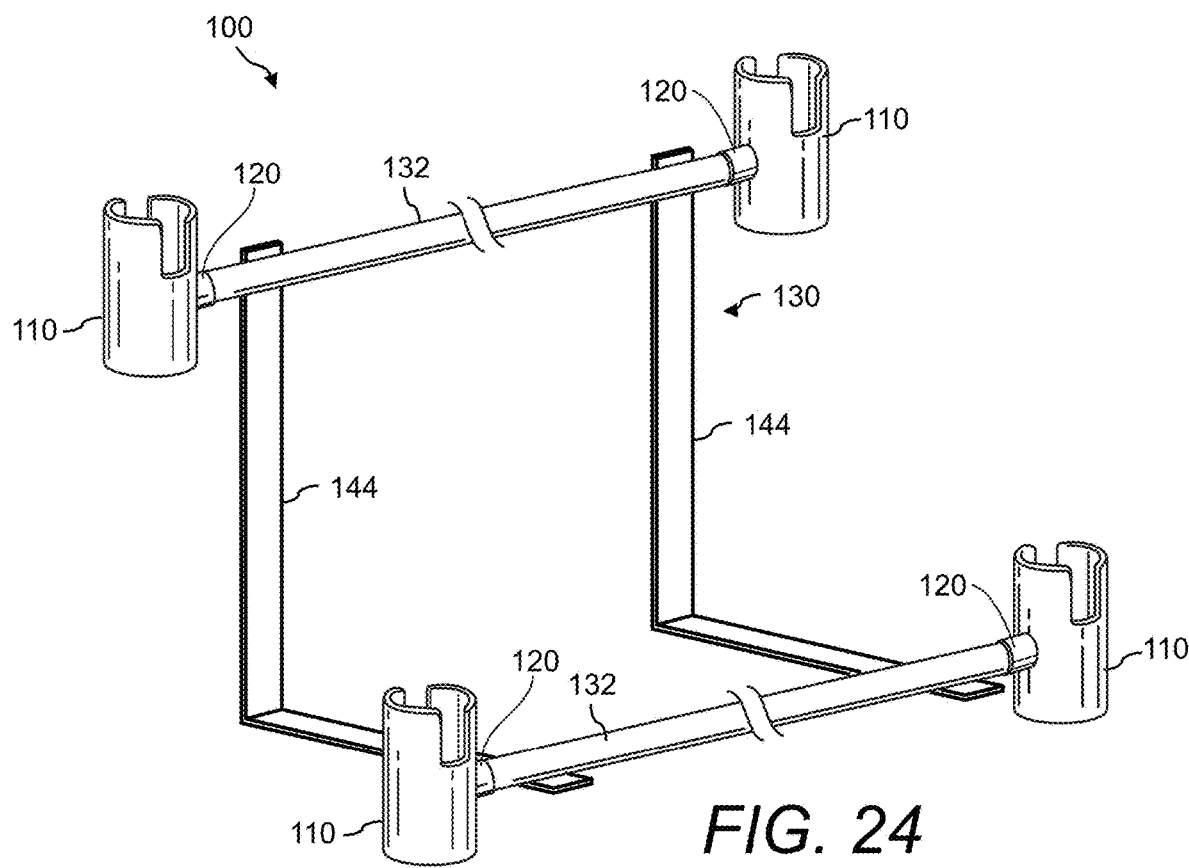
Figure 25:
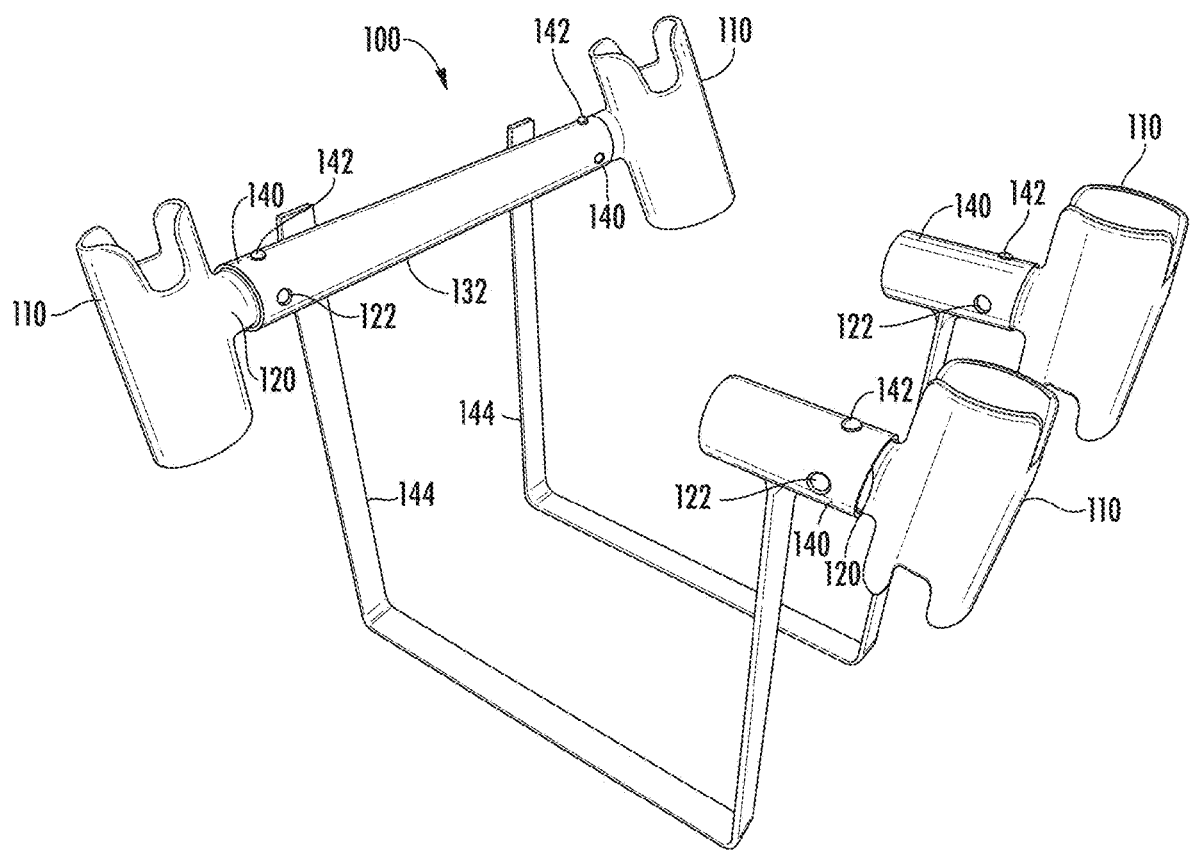
Figure 26:
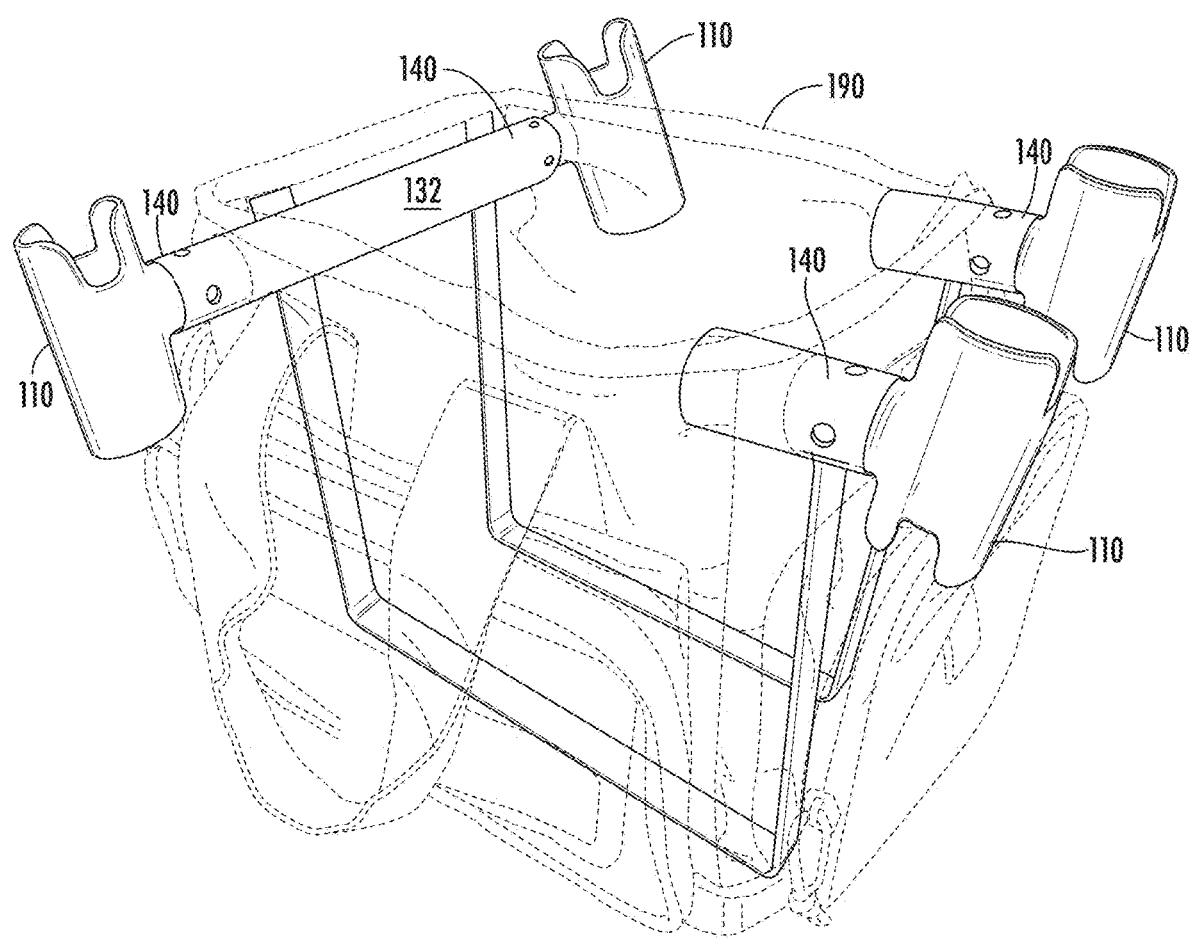
Figure 27:
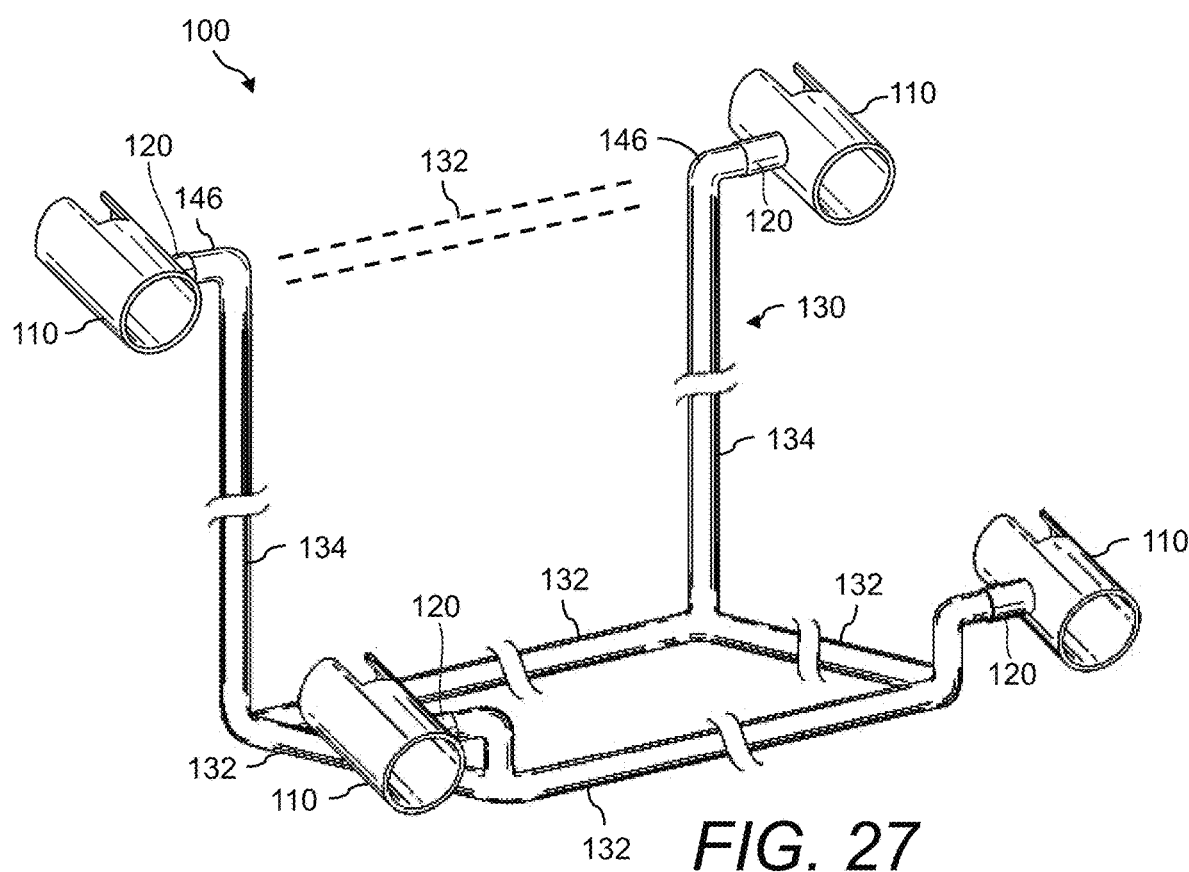

FIG. 24 through FIG. 28A illustrates yet other examples and/or features of the disclosed fishing rod holder system 100. For example, FIGS. 24-26 show examples of fishing rod holder system 100 in which the frame 130 includes both tubular members and flat members. In this example, the frame 130 of the fishing rod holder system 100 may include a pair of L-shaped or U-shaped flat members 144. In one example, as shown in FIG. 24, the fishing rod holder system 100 includes a pair of L-shaped flat members 144, and a horizontal member 132 may be arranged across an upper portion of flat members 144 and/or a lower portion of flat members 144. In another example, as shown in FIGS. 25-26, the fishing rod holder system 100 includes a pair of U-shaped flat members 144, and one or more horizontal members 132 that may be arranged across upper portions of flat members 144 and/or lower portions of flat members 144. Again, this arrangement may be sized to fit inside a portable pack, such as pack 190.

The horizontal members 132 need not extend continuously from one side of the frame 130 to the other. In one example, and referring now to FIG. 27, there may be a gap or space in the uppermost horizontal member 132, for example creating two elbow members 146 to which the rod holders 110 can connect. Or in the case of a fishing rod holder system 100 including a pair of U-shaped flat members 144, there may be a gap or space in one of the uppermost horizontal members 132, creating two independent receiving members 140, wherein receiving members 140 may be generally parallel with or perpendicular to the frame 130.

In some embodiments, the rod holders 110 may include a "telescoping" feature. In one example and referring now to FIGS. 28A-D, the length of the connecting member 120 of the rod holder 110 may be extended. In FIG. 28B, the connecting member 120 of the rod holder 110 may be an inside-fitting connecting member 120 wherein the spring-loaded button 142 is provided in the connecting member 120 and a line of through-holes 122 is provided along the length of, for example, the end of the horizontal member 132.

In FIG. 28C, the connecting member 120 of the rod holder 110 is an outside-fitting connecting member 120 wherein the spring-loaded button 142 is provided in the horizontal member 132 and a line of through-holes 122 is provided along the connecting member 120. In FIG. 28B and FIG. 28C, the "telescoping" action is provided by sliding the connecting member 120 of the rod holder 110 along the receiving member 140 and then latching the spring-loaded button 142 to any one of the through-holes 122. In another example, the telescoping feature may be provided via a turn lock coupler (e.g., turn lock coupler 166 of FIG. 37), cam lock coupler (e.g., cam lock coupler 160 of FIG. 25D), or pressure fit.

In some embodiments, a 90-degree ring clamp 150 may be used to secure members of the disclosed fishing rod holder system 100. In one example and referring now to FIG. 29, the 90-degree ring clamp 150 is used to slideably secure the connecting member 120 of the rod holder 110 to any member (e.g., rail member 136 of FIG. 17) of the frame 130 of the fishing rod holder system 100. In another example and referring now to FIG. 30, the 90-degree ring clamp 150 may be used to slideably secure one or more rod holders 110 together, wherein, in one example, one of the rod holders 110 may be affixed to a plate 152, and another rod holder 110 is attached to the connecting member 120 of the other rod holder 110 via the 90-degree ring clamp 150.

Figure 31A:
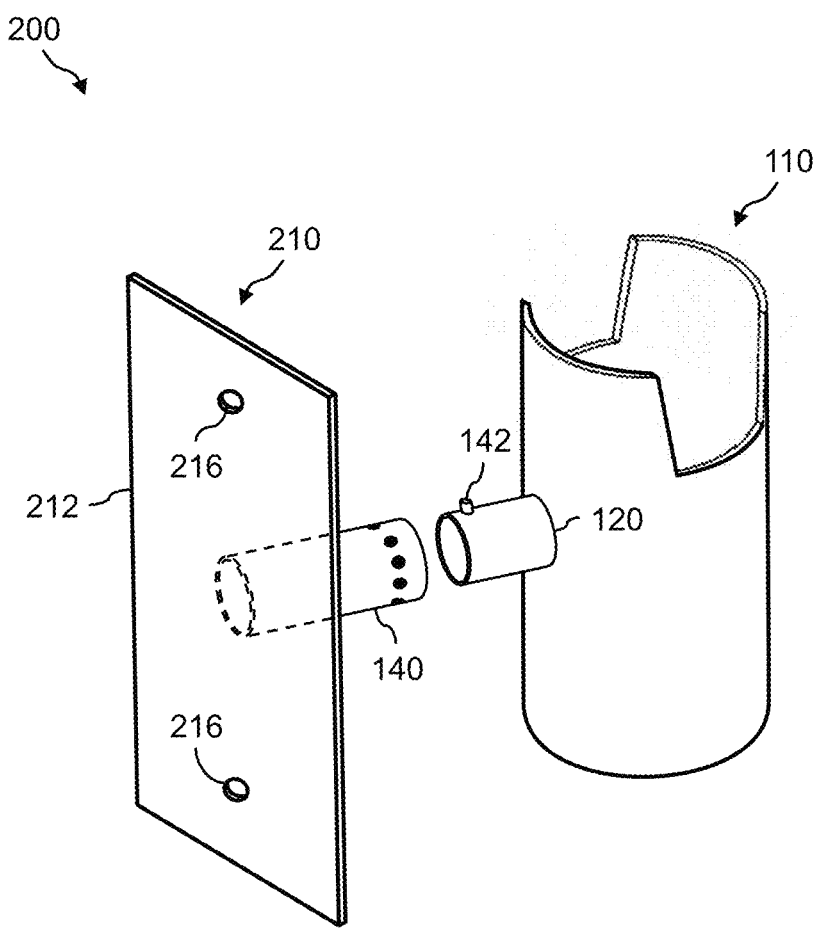
Figure 31B:
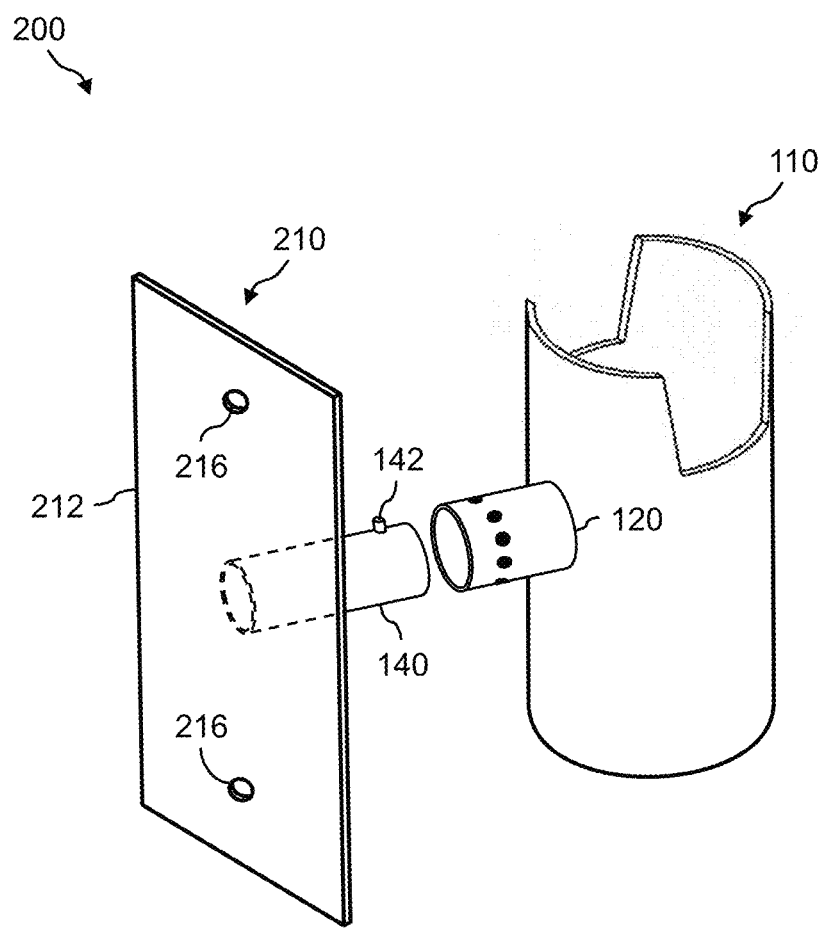
Figure 31C:
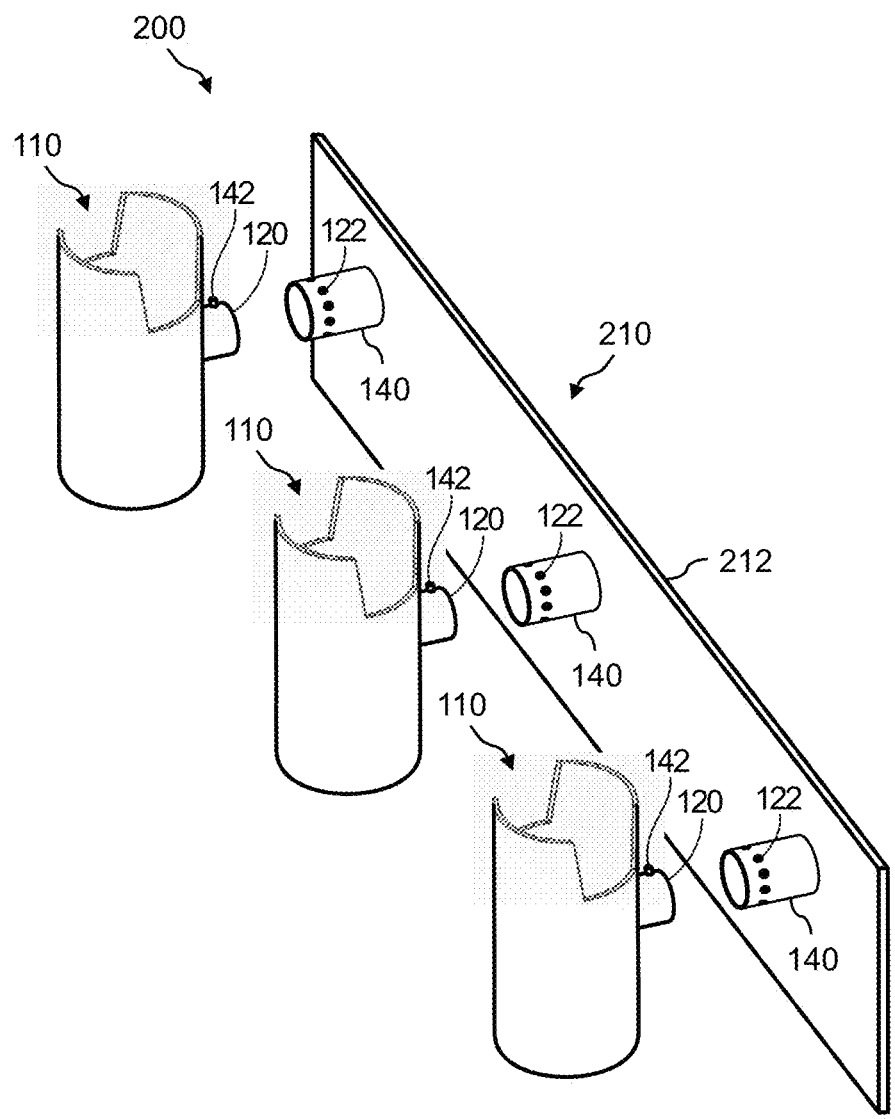

Referring now to FIGS. 31A-31C are perspective views of a fishing rod holder system 200, which is yet another example of the disclosed fishing rod holder system. In this example, the fishing rod holder system 200 includes a mount structure 210 for receiving the rod holder 110. The mount structure 210 may include a plate 212. The receiving member 140 preferably protrudes from one surface of the plate 212 and is substantially normal to the plate 212. In one example, the plate 212 may be about 2 inches wide and in the range of about 4 inches to about 6 inches long. The plate 212 may be, for example, PVC material, aluminum, stainless steel, or other suitable material. Additionally, one or more through-holes 216 (or slots) may be provided in the plate 212, wherein the through-holes 216 (or slots) may be used for fastening mount structure 210 to any other structure. FIG. 31A shows a mount structure 210 that is designed to receive an inside-fitting connecting member 120 of the rod holder 110. FIG. 31B shows a mount structure 210 that is designed to receive an outside-fitting connecting member 120 of the rod holder 110.

Referring now to FIG. 31C, the mount structure 210 is not limited to one receiving member 140 only. The length and/or width of the plate 212 may be adjusted so that a plurality of receiving members 140 can be arranged thereon for receiving a plurality of rod holders 110.

Figure 32A:
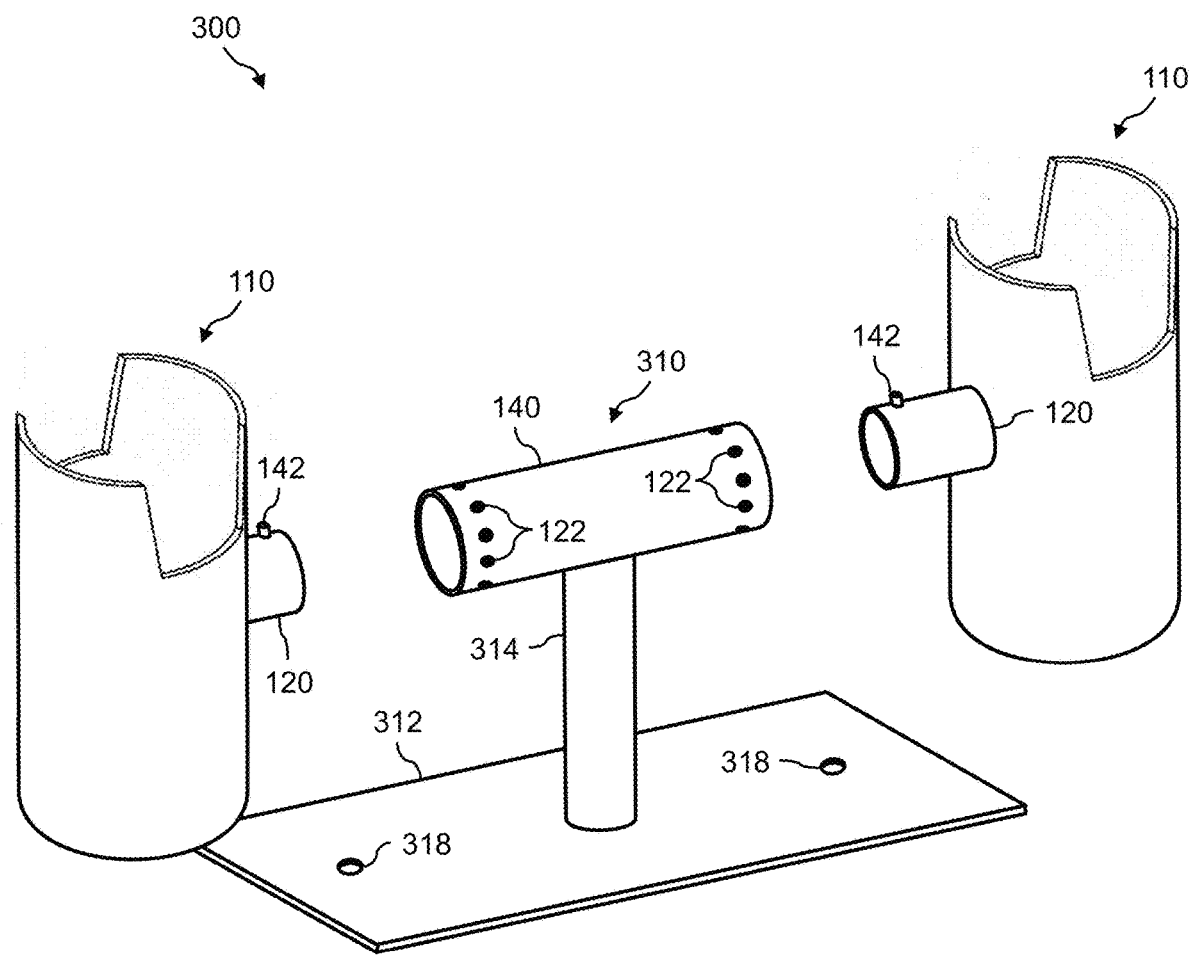
Figure 32B:
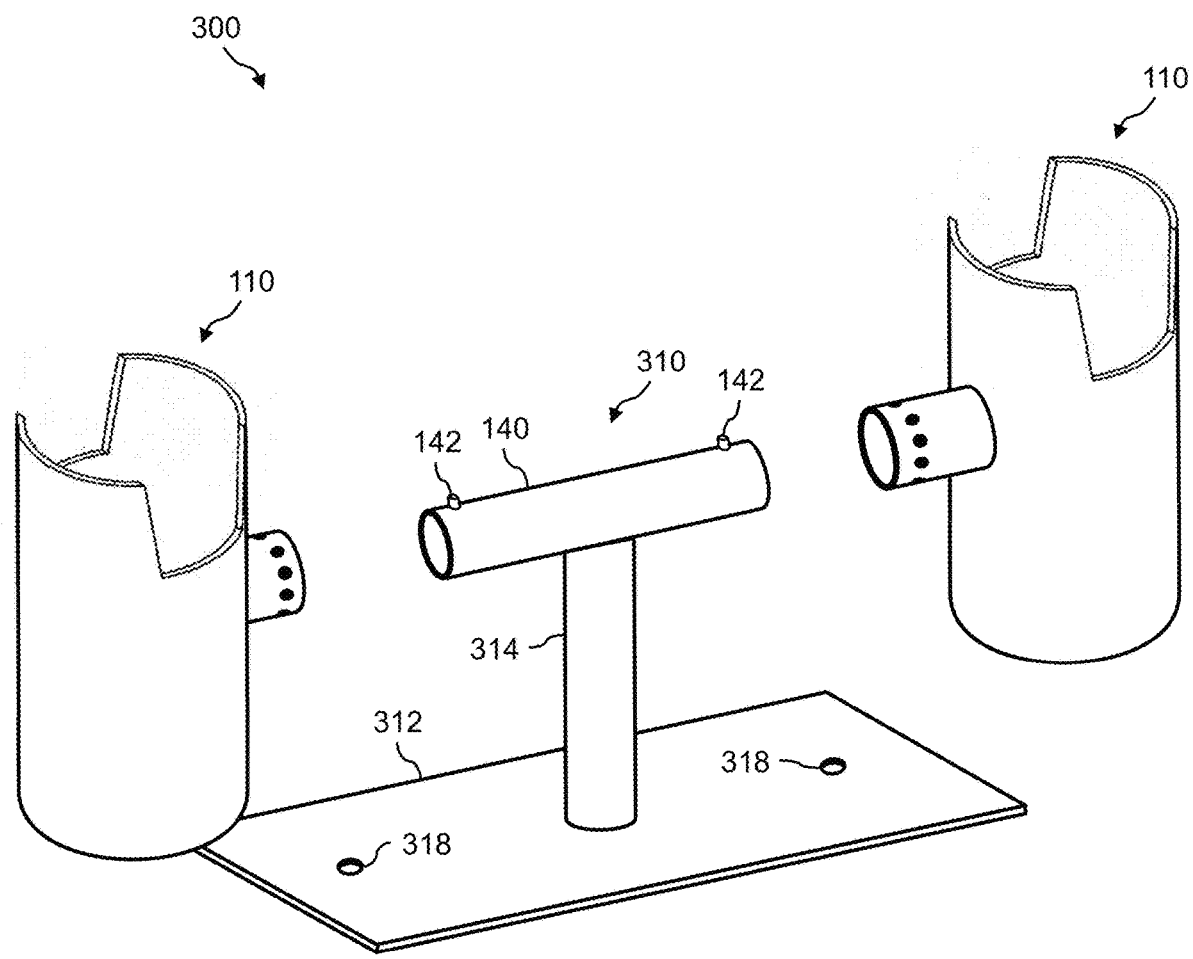

Referring now to FIG. 32A and FIG. 32B are perspective views of a fishing rod holder system 300, which is yet another example of the disclosed fishing rod holder system. In this example, the fishing rod holder system 300 includes an alternate mount structure 310 for receiving a pair of the rod holders 110. The mount structure 310 includes a plate 312. A member 314 protrudes from one surface of the plate 312 and is substantially normal to the plate 312. The receiving member 140, having receiving points on each end thereof, is arranged perpendicular to the opposite end of the member 314 as shown. A pair of the rod holders 110 may be attached to the receiving member 140, e.g., one rod holder 110 at each end. FIG. 32A shows a mount structure 310 that is designed to receive inside-fitting connecting members 120 of the rod holders 110. FIG. 32B shows a mount structure 310 that is designed to receive outside-fitting connecting members 120 of the rod holders 110.

Referring now to FIG. 33A and FIG. 33B are perspective views of a fishing rod holder system 400, which is still yet another example of the disclosed fishing rod holder system. The fishing rod holder system 400 is configured to be used in combination with a structure, for example a portable structure, such as in this case a cooler 450. The fishing rod holder system 400 may include a strap 410 that can be fastened around and tightened to the cooler 450. A corner plate 412 may be fastened to the strap 410 (e.g., via one or more slots formed in the corner plate 412). Alternatively, corner plate 412 may be directly attached to the structure, via screws, bolts, or other suitable mechanism. The corner plate 412 may have one or more receiving members 140 protruding therefrom, for example as shown in FIG. 33A, to which one or more rod holders 110 can be attached, for example as shown in FIG. 33B. The fishing rod holder system 400 is not limited to a corner plate 412 only. The fishing rod holder system 400 may include flat or straight plates with one or more receiving members 140 protruding therefrom securable by the strap 410 (or other suitable mechanism), to be used along flat portions of the cooler 450, or other such structure.

FIG. 35 illustrates another example embodiment of corner plate 412 for attaching to a corner of a structure (either permanent or portable structure). Corner plate 412 may include one or more receiving members 140 protruding therefrom, to which one or more rod holders 110 can be attached via their respective connecting members 120. Corner plate 412 may include through-holes (not shown) and/or slots/slits (not shown) to facilitate securing the corner plate 412 to the corner of a structure.

FIG. 35 illustrates various alternative examples for connecting a slide rail 136 to receiving members 140. In one example, angled plates, such as corner plates 412, having receiving members 140 protruding therefrom, may be attached to opposing corners of a structure 163. Alternatively, the corner plates 412 may be attached one above the other in a vertical fashion on the same corner edge. Slide rail 136 may extend from a first receiving member 140 affixed to a first angled plate, e.g., corner plate 412, to a second receiving member 140 affixed to a second angled plate. In another example, a pair of plates 152, having receiving members 140 protruding therefrom, are mounted to a surface at a distance apart substantially equal to that of a slide rail 136, and opposing ends of slide rail 136 are attached to corresponding receiving members 140. One or more rod holders 110 may be attached to slide rail member 136 using slideable members 138 and/or 90-degree ring clamps 150 that can ride along the rail members 136.

In some embodiments, an inline ring clamp may be used to secure members of the disclosed fishing rod holder system 100. In one example and referring now to FIG. 36, an inline ring clamp 160 may be used to secure end-to-end any two members of the fishing rod holder system 100. The inline ring clamp 160 may facilitate telescoping action.

Referring to FIG. 37 illustrates various examples of securing end-to-end any two members of the fishing rod holder system 100 and/or attaching a connecting member 120 of rod holder 110 to a receiving member 140. In one example, spring-loaded button 142 may be provided in the connecting member 120 of the rod holder 110 and one or more through-holes 122 are provided in the receiving member 140. Alternatively, spring-loaded button 142 may be provided in the receiving member 140 and one or more through-holes 122 may be provided in the connecting member 120 of the rod holder 110. In another example, connecting member 120 of the rod holder 110 maybe connected to the receiving member 140 via a split collar lock or turn lock coupler 166. In yet another example, connecting member 120 of the rod holder 110 maybe connected to the receiving member 140 via a 90-degree ring clamp 150. In still yet another example, connecting member 120 of the rod holder 110 maybe connected to the receiving member 140 via a swaged coupler 170. Swaged coupler 170 may be the end portion of the connecting member 120 of the rod holder 110 or of the receiving member 140. The above examples are not limited to use connecting the connecting member 120 of the rod holder 110 to the receiving member 140, but may also be employed to secure any two members of the fishing rod holder system 100.

The disclosed fishing rod holder system is not limited to the frame mount, flat surface mount, and angle surface mount configurations previously shown and described herein. The disclosed fishing rod holder system may include any type of frame or mount configuration as long as it is capable of holding at least one rod holder 110. Below, FIGS. 38-40C show other example configurations of the disclosed fishing rod holder system.

In addition to the frame mount (e.g., as shown in FIGS. 1-9, 17-22, and 24-28A), flat surface mount (e.g., as shown in FIGS. 30-32B), and angled surface mount (e.g., as shown in FIGS. 33-34) configurations, FIGS. 38-40C illustrate other example configurations of the disclosed fishing rod holder system 100, such as, but not limited to, a rail mountable receiving member, a flush mountable receiving member, and a track mountable receiving member.

Referring to FIG. 38 illustrates an example embodiment of a rail mount 172. In one embodiment rail mount 172 may include receiving member 140 and an adjustable U-bolt 174. Receiving member 140 is preferably spaced from U-bolt 174 a sufficient distance to allow the connecting member 120 of rod holder 110 to fully engage receiving member 140. Receiving member 140 may include one or more through-holes 122 for receiving a spring-loaded button 142 of a connecting member 120. Alternatively, receiving member 140 may include a spring-loaded button 142 for engaging one or more through-holes 122 of a connecting member 120. U-bolt 174 may be integrated with receiving member 140, such that the two legs of the U-bolt 174 pass through the width of the body of receiving member 140, wherein the U portion of the U-bolt 174 is disposed on one side of the body of the receiving member 140 and the legs of the U-bolt 174 extend outward from an opposing side. The receiving member 140 may further have an inward curved portion disposed in a side thereof that includes the U portion of the U-bolt 174.

In use, U-bolt 174 is positioned such a railing 176, to which the rail mount 172 is to be secured to, is captured between the body of receiving member 140 and the U portion of the U-bolt 174. The rail mount 172 is then maneuvered to position the receiving member 140 in the desired position on the railing and then the U-bolt 174 is tightened to secure the rail mount 172 in place. U-bolt 174 may be tightened using any conventional means, e.g., wing nuts or the like. The rail mount 172 may be used on a vertical, horizontal, or angled railing.

Referring to FIGS. 39A and 39B illustrate an example embodiment of a flush mount 178. Flush mount 178 is preferably used for mounting a fishing rod holder system 100, for example to a flat surface (e.g., counter top), in a substantially flush manner. In one embodiment flush mount 178 may include a receiving member 140, a plate 180, and a lower member 182. Lower member 182 is preferably a substantially hollow tube and affixed to a bottom surface of plate 180. Plate 180 preferably includes a through-hole substantially aligned with the hollow tube opening of lower member 182. Receiving member is removably attachable to plate 180 and lower member 182. A lower portion of receiving member 140 is preferably slightly smaller in diameter than an upper portion of receiving member 140. The outer diameter of the lower portion of receiving member 140 is substantially the same as the inner diameter of the plate 180 through-hole and hollow tube portion of lower member 182. The outer diameter of the upper portion of receiving member 140 is substantially the same as or larger than the outer diameter of the through-hole of plate 180. Receiving member 140 may further include a spring-loaded double button 181 for engaging one or more through-holes 122 of lower member 182, wherein the buttons of spring-loaded double button 181 are aligned one above the other with one disposed at the upper portion of receiving member 140 and the other disposed at the lower portion of receiving member 140. The spring-loaded double button 181 is configured such that by depressing the button disposed at the upper portion of receiving member 140 it causes the button disposed at the lower portion to be simultaneously depressed.

In use, the plate 180, with lower member 182 affixed thereto, is mounted into a flat surface of a structure, such that the plate 180 is substantially flush with the flat surface, and secured. Receiving member 140 may then be attached by inserting the lower portion of receiving member into the through-hole of plate 180 and into the hollow portion of lower member 182. The wider diameter of the upper portion of receiving member 140 prevents the receiving member from passing all the way through. The length of the lower portion of the receiving member 140 and spacing of the buttons of the spring-loaded double button 181, is such that when the lower portion of the receiving member 140 is fully inserted in the plate 180 and lower member 182, the bottom button of the spring-loaded double button 181 engages a through-hole 122 of the lower member 182, thus locking the receiving member in place.

A rod holder 110 may be connected to the upper portion of receiving member 140. The upper end portion of receiving member 140 may include one or more through-holes 122 for receiving a spring-loaded button 142 of the connecting member 120. Alternatively, the upper end portion of receiving member 140 may include a spring-loaded button 142 for engaging one or more through-holes 122 of the connecting member 120.

In this example, to remove the receiving member 140, the exposed upper button of the spring-loaded double button 181 is depressed, which by its spring action, causes the lower, concealed, button to be depressed, and thus disengages from the through-hole 122 of the lower member 182, therefore allowing the receiving member to be removed from the flush mount 178.

Referring to FIGS. 40A-40C illustrate an example embodiment of a track mount 184. Track mount 184 is preferably used for mounting a fishing rod holder system 100, for example to a track system, such as track 192. In one embodiment track mount 184 may include a receiving member 140, a plate 186, adjusters 188, and track feet 190. Receiving member 140 is preferably affixed to a top surface of plate 186 and protrudes out in a substantially perpendicular manner from about a middle portion thereof. Adjusters 188 preferably pass though plate 186 to engage track feet 190 disposed below a bottom surface of plate 186. Adjusters 188 preferably include an adjustment mechanism, such as a knob disposed on the top surface of plate 186, and engage the track feet 190 such that the track feet can be rotated and/or raised and lowered relative to the bottom surface of plate 186. Track feet 190 are configured such that they can be secured within a rail slot of track 192. In one example, track feet 190 may be oval in shape to allow the feet to be slid into the rail slot of track 192 and then when in position the track feet 190 are rotated and/or raised, for example using the adjustment knob of adjuster 188, to lock the feet underneath the rail slot of track 192. Alternatively, track feet 190 may be of any other suitable shape, including, but not limited to, square, rectangular, circular, triangular, or other suitable shape.

In use, track feet 190 are loosened (if needed) and positioned such that they can freely slide into a rail slot of track 192. The track mount 184 is then slid to a desired position along the track 192. Once in position, track feet 190 are locked in position by, for example, using the adjustment knob of adjuster 188, to lock the track feet 190 underneath the rail slot of track 192. A rod holder 110 may be connected to the receiving member 140 of the track mount 184. The receiving member 140 may include one or more through-holes 122 for receiving a spring-loaded button 142 of the connecting member 120. Alternatively, the receiving member 140 may include a spring-loaded button 142 for engaging one or more through-holes 122 of the connecting member 120 of the rod holder 110.

In this example, to remove the track mount 184, the track feet 190 are loosened, for example, using the adjustment knob of adjuster 188, to loosen the track feet 190 and rotate them so they may be slid out of the rail slot of track 192.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A rod holder system, comprising:
   a. a transferable rod holder, the rod holder comprising a substantially hollow tube and a connecting member extending outward from a side wall thereof; and
   b. one or more receiving members affixed to a first separate structure and extending outward therefrom, wherein an end portion of the one or more receiving members is configured to releasably mate with an end portion of the connecting member; and
   wherein the first separate structure comprises an angled corner plate configured to be installed to a second separate structure.

2. The system of claim 1 wherein the angled corner plate comprises two receiving members affixed thereto.

3. The system of claim 1 wherein the angled corner plate comprises about a 90 degree angle at about its midpoint.

4. The system of claim 1 wherein the rod holder is rotatable about the receiving member when attached thereto via the connecting member.

5. The system of claim 1 wherein the connecting member and receiving member are attachable via a spring-loaded button system, wherein a spring-loaded button is provided in one of the receiving member or the connecting member and one or more corresponding holes are provided in the other one of the receiving member or the connecting member.

6. The system of claim 5 wherein the one or more corresponding holes comprise a plurality of holes, and wherein the plurality of holes are configured to be spaced about an equal distance from one another about a periphery of the one of the connecting member or receiving member.

7. The system of claim 5 wherein the spring-loaded button system comprises a spring-loaded double button.

8. The system of claim 1 wherein the connecting member is affixed at about a midpoint along the length of the rod holder and extends outward in a perpendicular orientation therefrom.

9. The system of claim 1 wherein the hollow tube of the rod holder is configured to receive a handle portion of a fishing rod.

10. The system of claim 9 wherein the hollow tube of the rod holder comprises one or more slots and/or notches formed in a side wall thereof.

11. The system of claim 10 wherein the one or more slots and/or notches, comprise a first pair of opposing notches formed at a first end of the hollow tube of the rod holder.

12. The system of claim 11 comprising a second pair of opposing notches formed at a second end of the hollow tube of the rod holder and arranged about 90 degrees out of phase with the first pair of opposing notches at the first end of the hollow tube of the rod holder.

13. The system of claim 10 wherein the one or more slots and/or notches, comprise at least a single slot, wherein the single slot extends a full length of the hollow tube of the rod holder.

14. The system of claim 1 further comprising wherein the angled corner plate comprises one or more slots, wherein the one or more slots are configured to receive a strap therethrough.

15. The system of claim 1 further comprising an accessory holder, wherein the accessory holder is configured to releasable attach to one of the one or more receiving members.

16. The system of claim 1 wherein the connecting member is attachable to the receiving member via an angled ring clamp.

17. The system of claim 1 wherein the connecting member is attachable to the receiving member via a split collar lock.

18. The system of claim 1 wherein the receiving member comprises one of a T-mount or H-mount.

19. A transferable rod holder, comprising:
   a. a substantially hollow tube; and
   b. a connecting member extending outward from a side wall thereof, wherein the connecting member is configured to releasably mate with an end portion of a receiving member affixed to an angled corner plate.

20. A receiving member affixed to an angled corner plate, wherein the receiving member comprises an attachment mechanism configured to accept a connecting member affixed to a side wall of a rod holder in a releasable manner.

* * * * *